(12) United States Patent
Oh et al.

(10) Patent No.: US 12,075,491 B2
(45) Date of Patent: Aug. 27, 2024

(54) METHOD AND DEVICE FOR CHANNEL ACCESS IN WIRELESS COMMUNICATION SYSTEM

(71) Applicant: Samsung Electronics Co., Ltd., Suwon-si (KR)

(72) Inventors: Jinyoung Oh, Suwon-si (KR); Hyunseok Ryu, Suwon-si (KR); Sungjin Park, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 17/250,602

(22) PCT Filed: Aug. 9, 2019

(86) PCT No.: PCT/KR2019/010152
§ 371 (c)(1),
(2) Date: Feb. 8, 2021

(87) PCT Pub. No.: WO2020/032734
PCT Pub. Date: Feb. 13, 2020

(65) Prior Publication Data
US 2021/0298072 A1    Sep. 23, 2021

(30) Foreign Application Priority Data
Aug. 10, 2018    (KR) .................. 10-2018-0094010

(51) Int. Cl.
*H04W 74/0833*    (2024.01)
*H04W 72/0446*    (2023.01)
(Continued)

(52) U.S. Cl.
CPC ..... *H04W 74/085* (2013.01); *H04W 72/0446* (2013.01); *H04W 72/23* (2023.01); *H04W 74/006* (2013.01)

(58) Field of Classification Search
None
See application file for complete search history.

(56) References Cited

U.S. PATENT DOCUMENTS

| 10,051,627 B2 | 8/2018 | Seok |
| 10,433,292 B2 | 10/2019 | Yerramalli et al. |

(Continued)

FOREIGN PATENT DOCUMENTS

| CN | 105379401 A | 3/2016 |
| KR | 10-2017-0093071 A | 8/2017 |

(Continued)

OTHER PUBLICATIONS

Intellectual Property India, "Examination report under sections 12 &13 of the Patents Act" issued Feb. 2, 2022, in connection with Indian Patent Application No. 202117009137, 5 pages.

(Continued)

*Primary Examiner* — Saumit Shah

(57) ABSTRACT

A method of performing a channel access procedure of a terminal in an unlicensed band, includes: receiving, from a base station, information about a type of the channel access procedure in the unlicensed band; when the channel access procedure is a frame-based channel access procedure, receiving, from the base station, frame-based channel access procedure configuration information including at least one of fixed frame period (FFP) information, channel occupancy time (COT) information in an FFP, or fixed frame start slot offset information; determining whether the base station is occupying a channel, based on the received frame-based channel access procedure configuration information; and when it is determined that the base station is occupying the (Continued)

channel, transmitting and receiving a signal to and from the base station.

12 Claims, 10 Drawing Sheets

(51) Int. Cl.
  *H04W 72/23* (2023.01)
  *H04W 74/00* (2009.01)

(56) References Cited

U.S. PATENT DOCUMENTS

| | | | |
|---|---|---|---|
| 10,575,338 B2 | 2/2020 | Park et al. | |
| 10,701,677 B2 | 6/2020 | Park et al. | |
| 2016/0302226 A1* | 10/2016 | Kim | H04W 72/23 |
| 2017/0231011 A1 | 8/2017 | Park et al. | |
| 2017/0318607 A1* | 11/2017 | Tiirola | H04W 4/10 |
| 2019/0335500 A1* | 10/2019 | Zhang | H04W 72/0446 |
| 2020/0045738 A1 | 2/2020 | Oh et al. | |
| 2021/0092768 A1* | 3/2021 | Kim | H04W 74/0816 |
| 2022/0377683 A1* | 11/2022 | Myung | H04L 5/0048 |

FOREIGN PATENT DOCUMENTS

| | | |
|---|---|---|
| KR | 10-2017-0128120 A | 11/2017 |
| KR | 10-2020-0015284 A | 2/2020 |
| RU | 2628490 C1 | 8/2017 |

OTHER PUBLICATIONS

Office Action dated Oct. 7, 2022 in connection with Korean Patent Application No. 10-2018-0094010, 6 pages.
Decision to Grant a Patent for Invention dated Jul. 16, 2021 in connection with Russian Patent Application No. 2021105812, 17 pages.
Notice of Non-Final Rejection dated Jul. 20, 2022 in connection with Korean Patent Application No. 10-2018-0094010, 8 pages.
European Patent Office, "Supplementary European Search Report" issued Oct. 11, 2021, in connection with European Patent Application No. 19846421.6, 12 pages.
Nokia Networks, "UL LBT and Configurable Frame Structure for UL/DL operation", R1-152817, 3GPP TSG RAN WG1 Meeting #81, Fukuoka, Japan, May 25-29, 2015, 5 pages.
Mediatek Inc "eLAA uplink channel access", R1-165120, 3GPP TSG RAN WG1 Meeting #85 Nanjing, China, May 23-27, 2016, 9 pages.
Zte et al., "Discussion on frame structure and scheduling for NR-U", R1-1803949, 3GPP TSG RAN WG1 Meeting #92bis Sanya, China, Apr. 16-20, 2018, 5 pages.
Nokia et al., "Frame structure for NR-U operation", R1-1806105, 3GPP TSG RAN WG1 Meeting #93 Busan, Korea, May 21-25, 2018, 6 pages.
Qualcomm Incorporated, "TxOP Frame Structure for NR unlicensed," R1-1807386, 3GPP TSG RAN WG1 Meeting #93, Busan, Korea, May 20-25, 2018, 8 pages.
Office Action dated Jan. 18, 2023 in connection with Korean Patent Application No. 10-2018-0094010, 5 pages.
International Search Report and Written Opinion of the International Searching Authority in connection with International Application No. PCT/KR2019/010152 dated Nov. 29, 2019, 12 pages.
ETSI EN 301 893 V2.1.1 (May 2017), 5 GHz RLAN; Harmonised Standard covering the essential requirements of article 3.2 of Directive 2014/53/EU, May 2017, 135 pages.
Nokia, et al., "Frame structure for NR-U operation," R1-1804275, 3GPP TSG RAN WG1 Meeting #92bis, Sanya, P.R. China, Apr. 16-20, 2018, 5 pages.
Qualcomm Incorporated, "Channel access procedures for NR unlicensed," R1-1807389, 3GPP TSG RAN WG1 Meeting #93, Busan, Korea, May 21-25, 2018, 9 pages.
ZTE, et al., "Design of channel access mechanism for NR-U," R1-1803952, 3GPP TSG RAN WG1 Meeting #92bis, Sanya, China, Apr. 16-20, 2018, 5 pages.
Office Action issued Jan. 11, 2024, in connection with Korean Patent Application No. 10-2023-0050866, 10 pages.
Communication pursuant to Article 94(3) EPC dated Dec. 21, 2023, in connection with European Patent Application No. 19846421.6, 8 pages.
Ericsson, "System information structure and contents," 3GPP TSG-RAN WG2 Meeting #97bis, Tdoc R2-1702853, Spokane, USA, Apr. 2017, 9 pages.
Office Action dated Sep. 22, 2023, in connection with Chinese Patent Application No. 201980053374.0, 18 pages.
Office Action issued May 9, 2024, in connection with Chinese Patent Application No. 201980053374.0, 15 pages.

* cited by examiner

METHOD AND DEVICE FOR CHANNEL ACCESS IN WIRELESS COMMUNICATION SYSTEM

CROSS-REFERENCE TO RELATED APPLICATIONS

This application is a 371 National Stage of International Application No. PCT/KR2019/010152, filed Aug. 9, 2019, which claims priority to Korean Patent Application No. 10-2018-0094010, filed Aug. 10, 2018, the disclosures of which are herein incorporated by reference in their entirety.

BACKGROUND

1. Field

The present disclosure relates to a method and apparatus for transmitting and receiving data in a wireless communication system, and more particularly, to a channel access method and apparatus in a wireless communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post long-term evolution (LTE) systems.' The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and applied to the NR system, for example: beamforming, massive multiple-input multiple-output (MIMO), full dimensional MIMO (FD-MIMO), array antennas, analog beam-forming, and large-scale antennas. Also, in order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (COMP), and interference cancellation. In addition, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IOT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

In this regard, various attempts are being made to apply 5G communication systems to the IoT network. For example, 5G communication such as sensor networks, M2M communication, MTC, etc., are being implemented by using techniques such as beam-forming, MIMO, array antennas, etc. The application of cloud radio access network (RAN) as a big data processing technology described above may be an example of convergence of 5G communication technology and IoT technology.

As described above, various services are able to be provided due to the development of mobile communication systems, and thus, there is need for methods of effectively providing such services.

SUMMARY

Provided are a method and apparatus for effectively providing a service in a wireless communication system.

A channel access method of a terminal in a wireless communication system according to an embodiment includes: receiving, from a base station, information about a channel access procedure method in an unlicensed band of the base station; receiving, from the base station, at least one piece of information from among a fixed frame period, an offset, and a channel occupancy time in the fixed frame period via at least one signaling from among system information block (SIB) signaling and radio resource control (RRC) signaling; checking a channel access of the base station by searching for a physical downlink control channel (PDCCH) according to a PDCCH search period and resource configured within the fixed frame period; and when it is determined that the base station accessed the unlicensed band, performing transmission and reception of a signal according to scheduling.

According to embodiments, a service can be effectively provided in a wireless communication system.

DETAILED DESCRIPTION

Figure 1:
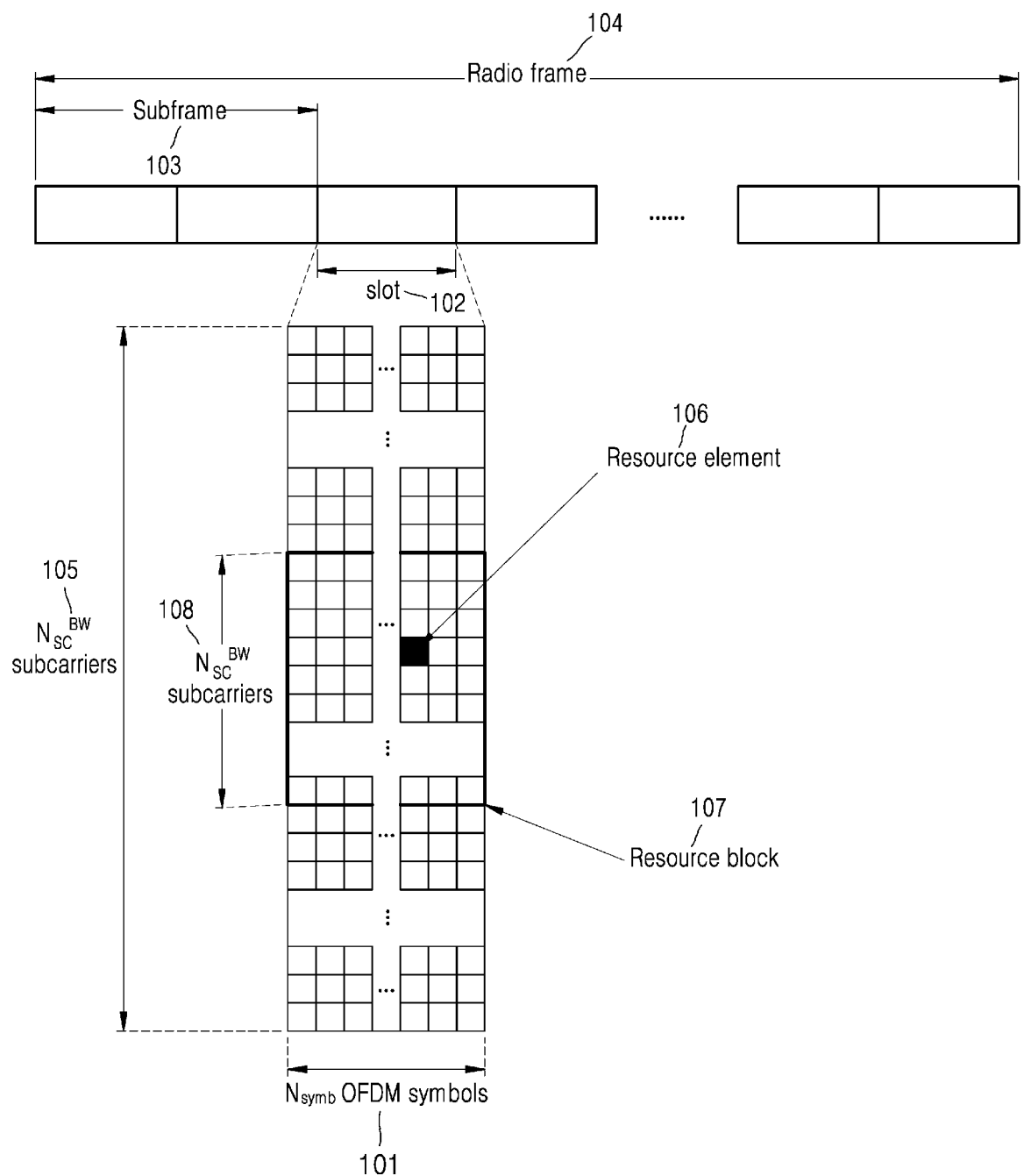
FIG. 1 is a diagram showing a transmission structure of a time-frequency domain that is a radio resource region of a new radio (NR) system.

A method of performing a channel access procedure of a terminal in an unlicensed band, according to an embodiment of the present disclosure, includes: receiving, from a base station, information about a type of the channel access procedure in the unlicensed band; when the channel access procedure is a frame-based channel access procedure, receiving, from the base station, frame-based channel access procedure configuration information including at least one of fixed frame period (FFP) information, channel occupancy time (COT) information in an FFP, or fixed frame start slot offset information; determining whether the base station is occupying a channel, based on the received frame-based channel access procedure configuration information; and when it is determined that the base station is occupying the channel, transmitting and receiving a signal to and from the base station.

The determining of whether the base station is occupying the channel may include determining that the base station is occupying the channel when a demodulation reference signal (DMRS) transmitted via a physical downlink control channel (PDCCH), downlink control information (DCI), or DCI including slot format information (SFI) is received or when a pre-set signal is received.

The method may further include receiving, from the base station, remaining channel occupancy time (RCOT) information for not transmitting a downlink signal during a COT, wherein the transmitting and receiving of the signal to and from the base station when it is determined that the base station is occupying the channel may include transmitting an uplink signal without scheduling on an uplink from the base station, based on the RCOT information.

The information about the type of the channel access procedure in the unlicensed band may be received, from the base station, via at least one of a master information block (MIB) transmitted via a physical broadcast channel (PBCH), a system information block (SIB) transmitted to a PDCCH or physical downlink shared channel (PDSCH), random access response (RAR) grant information, or radio signaling control (RRC) signaling.

The FFP information may be received via at least one of TDD_UL_DL Pattern information included in an SIB, TDD_UL_DL_slotConfig information transmitted via RRC signaling, the FFP information transmitted via the SIB or RRC signaling, or reference time information.

The determining of whether the base station is occupying the channel may include determining an FFP via a modulo operation between a pre-set period and an FFP according to the FFP information or determining the FFP based on the reference time information and the fixed frame start slot offset information.

When it is determined that the base station is not occupying the channel, performing of scheduling or the transmitting and receiving of a signal to and from the base station may not be performed.

A method of performing a channel access procedure of a base station in an unlicensed band, according to an embodiment of the present disclosure, includes: determining a type of the channel access procedure in the unlicensed band; transmitting, to a terminal, information about the type of the channel access procedure when it is determined to use a frame-based channel access procedure; transmitting, to the terminal, frame-based channel access procedure configuration information including at least one of fixed frame period (FFP) information, channel occupancy time (COT) information in an FFP, or fixed frame start slot offset information; performing the frame-based channel access procedure based on the frame-based channel access procedure configuration information; and when it is determined that a channel of the unlicensed band is in an idle state according to the frame-based channel access procedure, transmitting and receiving a signal to and from the terminal during a COT in an FFP.

The method may further include transmitting, to the terminal, at least one of slot format information about a slot configuring the COT in the FFP or slot format information about a symbol or slot not used during the COT in the FFP.

The method may further include performing the frame-based channel access procedure again when it is determined that the channel of the unlicensed band is not in the idle state according to the frame-based channel access procedure.

A terminal for performing a channel access procedure in an unlicensed band, according to an embodiment of the present disclosure, includes: a transceiver; at least one memory storing a program and data for performing the channel access procedure in the unlicensed band; and at least one processor configured to: by executing the program stored in the memory, receive, from a base station, information about a type of the channel access procedure in the unlicensed band; when the channel access procedure is a frame-based channel access procedure, receiving, from the base station, frame-based channel access procedure configuration information including at least one of fixed frame period (FFP) information, channel occupancy time (COT) information in an FFP, or fixed frame start slot offset information; determine whether the base station is occupying a channel, based on the received frame-based channel access procedure configuration information; and when it is determined that the base station is occupying the channel, transmit and receive a signal to and from the base station.

The at least one processor may be further configured to: determine that the base station is occupying the channel when a demodulation reference signal (DMRS) transmitted via a physical downlink control channel (PDCCH), downlink control information (DCI), or DCI including slot format information is received or when a pre-set signal is received.

The at least one processor may be further configured to: receive, from the base station, remaining channel occupancy time (RCOT) information for not transmitting a downlink signal during a COT; and transmitting an uplink signal without scheduling on an uplink from the base station, based on the RCOT information.

The information about the type of the channel access procedure in the unlicensed band may be received, from the base station, via at least one of a master information block (MIB) transmitted via a physical broadcast channel (PBCH), a system information block (SIB) transmitted to a physical downlink control channel (PDCCH) or a physical downlink shared channel (PDSCH), random access response (RAR) grant information, or radio resource control (RRC) signaling.

The FFP information may be received via at least one of TDD_UL_DL Pattern information included in an SIB, TDD_UL_DL_slotConfig information transmitted via RRC signaling, the FFP information transmitted via the SIB or RRC signaling, or reference time information.

The at least one processor may be further configured to: determine an FFP via a modulo operation between a pre-set period and an FFP according to the FFP information or determine the FFP based on the reference time information and the fixed frame start slot offset information.

When it is determined that the base station is not occupying the channel, performing of scheduling or transmitting and receiving of a signal to and from the base station may not be performed A base station for performing a channel access procedure in an unlicensed band, according to an embodiment of the present disclosure, includes: a transceiver; at least one memory storing a program and data for performing the channel access procedure in the unlicensed band; and at least one processor configured to execute the program stored in the memory to: determine a type of the channel access procedure in the unlicensed band; transmit, to a terminal, information about the type of the channel access procedure when it is determined to use a frame-based channel access procedure; transmit, to the terminal, frame-based channel access procedure configuration information including at least one of fixed frame period (FFP) information, channel occupancy time (COT) information in an FFP, or fixed frame start slot offset information; perform the frame-based channel access procedure based on the frame-based channel access procedure configuration information; and when it is determined that a channel of the unlicensed band is in an idle state according to the frame-based channel access procedure, transmit and receive a signal to and from the terminal during a COT in an FFP.

The at least one processor may be further configured to: transmit, to the terminal, at least one of slot format information about a slot configuring the COT in the FFP or slot format information about a symbol or slot not used during the COT in the FFP.

The at least one processor may be further configured to: perform the frame-based channel access procedure again when it is determined that the channel of the unlicensed band is not in the idle state according to the frame-based channel access procedure.

Hereinafter, embodiments of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification.

Advantages and features of the present disclosure and methods of accomplishing the same may be understood more readily by reference to the embodiments described in detail below and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the embodiments described in detail below and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

A $5^{th}$ (5G) system considers resources regarding various services compared to an existing 4G system. For example, most representative services of the 5G system include an enhanced mobile broadband (eMBB) service, an ultra-reliable and low latency communication (URLLC) service, a massive machine type communication (mMTC) service, and an evolved multimedia broadcast/multicast service (eMBMS). However, the present disclosure is not limited to the above examples. Also, a system providing the URLLC service may be referred to as an URLLC system, and a system providing the eMBB service may be referred to as an eMBB system. Here, the terms 'service' and 'system' may be used interchangeably.

As such, a plurality of services may be provided to a user in a communication system, and a method for providing each service in a same time section according to characteristics, and an apparatus using the method are required to provide the plurality of services to a user.

A wireless communication system, for example, a long-term evolution (LTE) or long-term evolution-advanced (LTE-A) system or a 5G new radio (NR) system, may be configured such that a terminal receives at least one downlink signal from among pieces of downlink control information (DCI) (for example, a channel-state information reference signal (CSI-RS), a physical broadcast channel (PBCH), or a physical downlink shared channel (PDSCH)) by transmitting, by a base station to the terminal through a physical downlink control channel (PDCCH), the DCI including resource assignment information in which the downlink signal is transmitted.

For example, the base station transmits the DCI indicating the terminal to receive the PDSCH in a subframe n via the PDCCH in the subframe n, and the terminal, upon receiving the DCI, receives the PDSCH in the subframe n according to the received DCI.

Also, the LTE, LTE-A, or NR system may be configured such that the terminal transmits, to the base station, at least one uplink signal from among pieces of uplink control information (for example, a sounding reference signal (SRS), uplink control information (UCI), a physical random access channel (PRACH), or a physical uplink shared channel (PUSCH)) by transmitting, by the base station to the terminal via the PDCCH, DCI including uplink resource assignment information.

For example, upon receiving uplink transmission configuration information (or uplink DCI or uplink grant) transmitted from the base station via the PDCCH in the subframe n, the terminal may perform PUSCH transmission according to a pre-defined time (for example, n+4), a time set via a higher layer signal (for example, n+k), or uplink signal transmission time indication information (for example, n+k) included in the uplink transmission configuration information.

When configured downlink transmission is transmitted from the base station to the terminal via an unlicensed band or configured uplink transmission is transmitted from the terminal to the base station via the unlicensed band, a transmitting device (the base station or terminal) may perform a channel access procedure (or listen-before-talk (LBT)) on the unlicensed band where signal transmission is configured before or immediately before a configured signal transmission start time point, and when the unlicensed band is determined to be in an idle state according to a result of performing the channel access procedure, the transmitting device may perform the configured signal transmission by accessing the unlicensed band.

When it is determined that the unlicensed band is not in an idle state or it is determined that the unlicensed band is in an occupied state according to the channel access procedure performed by the transmitting device, the transmitting device is unable to access the unlicensed band and thus may be unable to perform the configured signal transmission. In the channel access procedure in the unlicensed band where the signal transmission is configured, the transmitting device generally receives a signal in the unlicensed band for a certain period of time or a time calculated according to a pre-defined rule (for example, a time calculated via a random value selected by at least the base station or the terminal), and the idle state of the unlicensed band may be determined by comparing the strength of the received signal with a threshold value that is pre-defined or calculated according to a function including at least one variable from among a channel bandwidth or a bandwidth of a signal where a signal to be transmitted is transmitted, strength of transmit power, and a beam width of a transmission signal.

For example, when the strength of a signal received by the transmitting device for 25 us is smaller than the pre-defined threshold value −72 dBM, the transmitting device may determine that the unlicensed band is in the idle state and perform the configured signal transmission. Here, a maximum possible time for the signal transmission may be limited according to a maximum channel occupancy time defined for each country or region in the unlicensed band or a type of the transmitting device (for example, the base station or the terminal, or a master device or a slave device). For example, in Japan, after performing the channel access procedure in the unlicensed band of 5 GHZ, the base station or the terminal may transmit a signal while occupying a channel without having to perform an additional channel access procedure for a maximum time of 4 ms. When the strength of the signal received for 25 us is greater than the pre-defined threshold value of −72 dBm, the base station determines that the unlicensed band is not in the idle state and does not transmit a signal.

In the 5G communication system, various technologies, such as retransmission in code block group units, a technology of transmitting an uplink signal without uplink scheduling information, and the like will be introduced to provide various services and support a high data rate. Accordingly, when 5G communication is to be performed via the unlicensed band, an effective channel access procedure considering various variables is required.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a 5G or NR communication standards are being developed with 5G wireless communication systems.

In the 5G wireless communication systems, at least one service among eMBB, mMTC, and URLLC may be provided to the terminal. The above services may be provided to a same terminal for a same time section. In an embodiment, eMBB may be a service aiming at high-speed transmission of high capacity data, mMTC may be a service aiming at terminal power minimization and multiple terminal connections, and URLLC may be a service aiming at high reliability and low delay, but are not limited thereto. These three services may be important scenarios in an LTE system or a 5G/NR system after LTE, but an embodiment is not limited thereto.

Hereinafter, a base station is an entity that assigns resources of a terminal, and may be at least one of an eNode B (eNB), a Node B (NB), a base station (BS), a wireless access unit, a BS controller, and a node on a network. Examples of a terminal may include a user equipment (UE), a mobile station (MS), a cellular phone, a smartphone, a computer, a multimedia system capable of performing a communication function, or the like. In the present disclosure, a downlink (DL) is a wireless transmission path of a signal transmitted from a base station to a terminal, and an uplink (UL) is a wireless transmission path of a signal transmitted from a terminal to a base station. Also, hereinafter, embodiments of the present disclosure are described with an LTE or LTE-A system as an example, and to describe a method and apparatus proposed in the present disclosure, general terms such as a physical channel or signal in the LTE or LTE—A system may be used. Embodiments of the disclosure may be applied to other communication systems having a technical background or channel type similar to a mobile communication system described in the present disclosure. For example, 5G mobile communication technology (5G or NR) developed after LTE-A may be included. Also, it will be understood by one of ordinary skill in the art that embodiments of the present disclosure may be applied to other communication systems through some modifications without departing from the scope of the present disclosure.

As a representative example of the broadband wireless communication system, the NR system has adopted an orthogonal frequency division multiplexing (OFDM) scheme in a DL and has adopted both OFDM and single carrier frequency division multiple access (SC-FDMA) schemes in UL. A multiple access scheme generally assigns and operates time-frequency resources including data or control information to be transmitted for each user to prevent the time-frequency resources from overlapping with each other, that is, to establish orthogonality, thereby distinguishing the data or the control information of each user.

An NR system employs a hybrid automatic repeat request (HARQ) scheme in which a physical layer retransmits data when a decoding failure occurs in initial transmission. In the HARQ scheme, when a receiver fails to accurately decode data, the receiver transmits information (negative acknowledgment (NACK)) indicating the decoding failure to a transmitter so that the transmitter may retransmit the corresponding data in the physical layer. The receiver combines the data retransmitted by the transmitter with the data whose previous decoding had failed so as to improve data reception performance. In addition, when the receiver accurately decodes the data, information (acknowledgment (ACK)) indicating successful decoding is transmitted to the transmitter so that the transmitter may transmit new data.

In the present disclosure hereinafter, a channel access procedure and method in an unlicensed band, and method and apparatus for transmitting and receiving a signal in an unlicensed band will be described. In detail, a method of performing a frame-based channel access procedure and a method of transmitting and receiving a signal in an unlicensed band accessed via the frame-based channel access procedure, in a wireless communication system, in particular, in a system including a node receiving a DL signal or a node that is to transmit a UL signal in an unlicensed band, will be described. The present disclosure proposes a method of transmitting a channel occupancy time of a transmitting device and a slot structure in the channel occupancy time via a slot format indicator, and transmitting, by a node that received the slot format indicator, a UL signal by determining the channel occupancy time and the slot structure, when a node transmitting a DL signal or a node that is to transmit a UL signal in an unlicensed band performed a frame-based channel access procedure.

FIG. 1 is a diagram showing a transmission structure of a time-frequency domain that is a radio resource region of an NR system.

In FIG. 1, a horizontal axis represents a time domain and a vertical axis represents a frequency domain in the radio resource region. In the time domain, a minimum transmission unit may be an OFDM or discrete Fourier transform-spread-OFDM (DFT-s-OFDM) symbol, and $N_{symb}$ OFDM symbols 101 or DFT-s-OFDM symbols may gather to form one slot 102. According to an embodiment, an OFDM symbol is a symbol for a case where a signal is transmitted or received by using an OFDM scheme, and a DFT-s-OFDM symbol may include a symbol for a case where a signal is transmitted or received by using a DFT-s-OFDM or SC-FDMA multiplexing scheme. Hereinafter, for convenience of description, the present disclosure will be described by referring to an OFDM symbol and a DFT-s-OFDM symbol commonly as an OFDM symbol without distinction, and will be described based on DL signal transmission and reception, but the present disclosure is applicable to UL signal transmission and reception.

When a subcarrier spacing is 15 kHz, one slot 102 configures one subframe 103, and the lengths of the slot 102 and subframe 103 may each be 1 ms. According to an embodiment, the number of slots 102 configuring one subframe 103 and the length of slot 102 may vary according to the subcarrier spacing. For example, when the subcarrier spacing is 30 kHz, four slots 102 may gather to configure one subframe 103. Here, the length of slot 102 is 0.5 ms and the length of subframe 103 is 1 ms. Further, a radio frame 104 may be a time domain interval configured of 10 subframes 103. A minimum transmission unit in the frequency domain is a subcarrier, and a transmission bandwidth of the whole system is configured of $N_{sc}^{BW}$ subcarriers 105 in total.

However, specific numerical values such as the subcarrier spacing, the number of slots 102 included in the subframe 103, the length of slot 102, and the length of subframe 103 may be variably applied. For example, in an LTE system, the subcarrier spacing is 15 kHz but two slots 102 gather to configure one subframe 103, wherein the length of slot 102 is 0.5 ms and the length of subframe 103 is 1 ms.

In the time-frequency domain, a base unit of a resource is a resource element (RE) 106, and may be indicated as an OFDM symbol index and a subcarrier index. A resource block (RB) 107 or a physical resource block (PRB) is defined as the $N_{symb}$ successive OFDM symbols 101 in the time domain and $N_{SC}^{RB}$ successive subcarriers 108 in the frequency domain. Accordingly, one RB 107 in one slot 102 may include $N_{symb} \times N_{SC}^{RB}$ REs 106. In general, a frequency domain minimum assignment unit of data is the RB 107. In an NR system, $N_{symb}=14$ and $N_{SC}^{RB}=12$ in general, and the number ($N_{RB}$) of RBs 107 may change according to a bandwidth of a system transmission band. In the LTE system, $N_{symb}=7$ and $N_{SC}^{RB}=12$ in general, and $N_{RB}$ may change according to the bandwidth of the system transmission band.

DCI may be transmitted within first N OFDM symbols in a subframe. Generally, N={1, 2, 3} and a terminal may be configured with the number of symbols where the DCI is transmittable from a base station via a higher layer signal. Also, the base station may change the number of symbols where the DCI is transmittable from a slot for each slot depending on an amount of control information to be transmitted from a current slot, and transmit information about the number of symbols to the terminal via a separate DL control channel.

In the NR or LTE system, scheduling information on DL data or UL data may be transmitted from the base station to the terminal through DCI. According to an embodiment, the DCI may be defined according to various formats and may indicate, depending on each format, whether the DCI is scheduling information (UL grant) for UL data or scheduling information (DL grant) for DL data, whether the DCI is compact DCI with a small size of control information, whether the DCI is fall-back DCI, whether spatial multiplexing using a multi-antenna is applied, and whether the DCI is power control DCI. For example, a DCI format (for example, DCI format 1_0 of NR) that is the scheduling control information (DL grant) for DL data may include one of following pieces of control information.

DCI format identifier: An identifier identifying a format of received DCI

Frequency domain resource assignment: Indicates an RB assigned for data transmission Time domain resource assignment: Indicates a slot and symbol assigned for data transmission Virtual resource block (VRB)-to-PRB mapping: Indicates whether to apply VRB mapping Modulation and coding scheme (MCS): Indicates a modulation scheme used for data transmission and the size of a transport block (TB) that is data to be transmitted New data indicator: Indicates whether HARQ transmission is initial transmission or retransmission.

Redundancy version: Indicates a redundancy version of HARQ.

HARQ process number: Indicates a process number of HARQ.

PDSCH assignment information (downlink assignment index): Indicates the terminal of the number of PDSCH reception results (for example, the number of HARQ-ACKs) to be reported to the base station Transmit power control (TPC) command for physical UL control channel (PUCCH): Indicates a transmit power control command for a PUCCH that is a UL control channel PUCCH resource indicator: Indicates a PUCCH resource used for HARQ-ACK report including a reception result for PDSCH configured via corresponding DCI PUCCH transmission timing indicator (PDSCH-to-HARQ_feedback timing indicator): Indicates slot or symbol information where PUCCH for HARQ-ACK report including a reception result for PDSCH configured via corresponding DCI is to be transmitted The DCI may be transmitted through the PDCCH (or control information, hereinafter, interchangeably used) or an enhanced PDCCH (EPDCCH) (or enhanced control information, hereinafter, interchangeably used) after passing through a channel coding and modulation process. Hereinafter, description that the PDCCH or EPDCCH is transmitted or received may be understood as transmission or reception of the DCI on the PDCCH or EPDCCH, and PDSCH transmission or reception may be understood as DL data transmission or reception on a PDSCH.

In general, the DCI is scrambled by a specific radio network temporary identifier (RNTI) (or terminal identifier (C-RNTI)) independently with respect to each terminal, is added with a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The DL data may be transmitted through a PDSCH that is a physical channel for transmitting the DL data. The PDSCH may be transmitted after the control channel transmission interval, and scheduling information, such as a concrete mapping location or a modulation scheme in the frequency domain, may be determined based on the DCI to be transmitted through the PDCCH.

The base station notifies the terminal of a modulation scheme applied to the PDSCH to be transmitted and the size of data to be transmitted (transport block size (TBS)) through a modulation coding scheme (MCS) among the control information configuring the DCI. According to an embodiment, the MCS may be composed of 5 bits, or may be composed of bits less than or greater than 5 bits. The TBS corresponds to the size before channel coding for error correction is applied to data (transport block (TB)) to be transmitted by the base station.

The modulation scheme supported in the NR system is quadrature phase shift keying (QPSK), 16 quadrature amplitude modulation (QAM), 64QAM, or 256QAM and respective modulation orders ($Q_m$) correspond to 2, 4, 6, and 8. In other words, 2 bits per symbol may be transmitted in QPSK, 4 bits per symbol may be transmitted in 16QAM, 6 bits per symbol may be transmitted in 64QAM and 8 bits per symbol may be transmitted in 256QAM. Also, a modulation scheme of 256QAM or more may be used according to system modification.

In the NR system, a UL/DL HARQ adapts an asynchronous HARQ method in which data retransmission time is not fixed. With reference to DL, when an HARQ NACK is fed back from the terminal with respect to initially transmitted data transmitted by the base station, the base station may freely determine a transmission time of retransmitted data through a scheduling operation. The terminal buffers the data that is determined as an error as the result of decoding the received data for an HARQ operation, and then may perform combining with data retransmitted from the base station. HARQ ACK/NACK information of PDSCH transmitted in a subframe n-k may be transmitted from the terminal to the base station via the PUCCH or PUSCH in a subframe n.

According to an embodiment, in the 5G communication system such as NR, a value of k may be transmitted by being included in the DCI indicating or scheduling reception for the PDSCH transmitted in the subframe n-k or may be configured to the terminal via a higher layer signal. Here, the base station may configure one or more values of k via the higher layer signal or may indicate a specific value of k via the DCI. The value of k may be determined depending on a HARQ-ACK processing capability of the terminal, i.e., a minimum time required for the terminal to receive the PDSCH, and generate and report the HARQ-ACK for the PDSCH. Also, the terminal may be a pre-defined value or a default value until the value of k is configured.

The wireless communication system, and the method and apparatus proposed in embodiments of the present disclosure have been described based on the NR system, but the content of the present disclosure is not limited to the NR system and may be applied to various communication systems, such as LTE, LTE-A, LTE-A-Pro, and 5G systems. Also, the present disclosure is described based on a system and apparatus transmitting or receiving a signal by using an unlicensed band, but the content of the present disclosure may also be applied to a system operating in a licensed band.

Hereinafter, higher signaling or higher layer signal in the present disclosure may be a method of transmitting a signal from the base station to the terminal by using a DL data channel of a physical layer or from the terminal to the base station by using a UL data channel of a physical layer, and may include a method of transmitting a signal via radio resource control (RRC) signaling, packet data convergence protocol (PDCP) signaling, or medium access control (MAC) control element (CE). Also, the higher signaling or higher layer signal may include system information commonly transmitted to a plurality of terminals, for example, a system information block (SIB).

In a system performing communication in an unlicensed band, a transmitting device (the base station or terminal) that is to transmit a signal via the unlicensed band may perform a channel access procedure (or LBT) for the unlicensed band for performing communication before transmitting the signal, and perform signal transmission by accessing the unlicensed band when it is determined that the unlicensed band is in an idle state according to the channel access procedure. When it is determined that the unlicensed band is not in the idle state according to the performed channel access procedure, the transmitting device is unable to perform the signal transmission.

The channel access procedure in the unlicensed band may be largely divided into two depending on whether a starting time of the channel access procedure is fixed (frame-based equipment (FBE)) or variable (load-based equipment (LBE)). Here, the FBE or the LBE may be determined depending on whether a transmit/receive structure of the transmitting device has one period or does not have a period, in addition to the starting time of the channel access procedure. The meaning of the starting time of the channel access procedure being fixed may be that the channel access procedure of the transmitting device may be periodically initiated according to a pre-defined period or a period declared or configured by the transmitting device. Another meaning may be that the transmit/receive structure of the transmitting device may have one period. The meaning of the starting time of the channel access procedure being variable may be that the starting time of the channel access procedure of the transmitting device may be initiated at any time the transmitting device is to transmit a signal via the unlicensed band. Another meaning may be that the transmit/receive structure of the transmitting device may be configured when necessary without having one period.

Hereinafter, the channel access procedure when the starting time of the channel access procedure of the transmitting device is variable (LBE) (hereinafter, a traffic-based channel access procedure or a channel access procedure) will be described.

In the channel access procedure in the unlicensed band, the transmitting device may measure a signal received via the unlicensed band for a fixed period of time or a time calculated according to a pre-defined rule (for example, a time calculated via a random value selected by at least the base station or the terminal), and determine the idle state of the unlicensed band by comparing the strength of the received signal with a threshold value that is pre-defined or calculated according to a function for determining the size of a reception signal strength, the function including at least one variable from among a channel bandwidth or a bandwidth of a signal where a signal to be transmitted is transmitted, and strength of transmit power.

For example, the transmitting device may measure the strength of the signal for X us (for example, 25 us) immediately before a time a signal is to be transmitted, and when the measured strength of the signal is smaller than a pre-defined or calculated threshold value T (for example, −72 dBm), determine that the unlicensed band is in the idle state, and transmit a configured signal. Here, after the channel access procedure, a maximum possible time for continuous signal transmission may be restricted according to a maximum channel occupancy time defined for each country, region, and frequency band according to each unlicensed band, and may also be restricted according to a type of the transmitting device (for example, the base station or the terminal, or a master device or a slave device). For example, in Japan, the base station or terminal may occupy, in the unlicensed band of 5 GHz, a channel and transmit a signal without having to perform an additional channel access procedure for a maximum time of 4 ms, with respect to the unlicensed band determined to be in the idle state after performing the channel access procedure.

In detail, when the base station or terminal is to transmit a DL or UL signal in the unlicensed band, the channel access procedure that may be performed by the base station or terminal may be divided into following types.

Type 1: Transmit a UL/DL signal after performing a channel access procedure for a variable time Type 2: Transmit a UL/DL signal after performing a channel access procedure for a fixed time Type 3: Transmit a UL/DL signal without performing a channel access procedure A transmitting node (hereinafter, the base station or terminal) that is to transmit a signal in the unlicensed band may determine the channel access procedure according to a type of the signal to be transmitted. Hereinafter, for convenience of description, the present disclosure will be described assuming that the transmitting node is the base station, and the transmitting node and the base station may be interchangeably used.

For example, when the base station is to transmit a DL signal including a DL data channel in the unlicensed band, the base station may perform the channel access procedure of Type 1. When the base station is to transmit a DL signal not including a DL data channel in the unlicensed band, for example, transmit a synchronization signal or DL control channel, the base station may perform the channel access procedure of Type 2 and transmit the DL signal.

Here, a type of the channel access procedure may be determined according to a transmission length of a signal to be transmitted in the unlicensed band or a length of time or section used by occupying the unlicensed band. Generally, Type 1 may need to perform the channel access procedure for a time longer than performing the channel access procedure of Type 2. Accordingly, the channel access procedure of Type 2 may be performed when a signal is to be transmitted for a time equal to or less than a short time section or reference time (for example, X ms or Y symbols). On the other hand, the channel access procedure of Type 1 may be performed when a signal is to be transmitted for a time equal to or greater than a long time section or reference time (for example, X ms or Y symbols). In other words, different types of channel access procedure may be performed according to a time of using the unlicensed band.

When the channel access procedure of Type 1 is performed according to at least one reference described above, the transmitting node may determine a channel access priority class according to a quality of service class identifier (QCI) of a signal to be transmitted in the unlicensed band, and perform the channel access procedure by using at least one value from among configuration values pre-defined for the determined channel access priority class as in Table 1. Table 1 below is a table showing a mapping relationship between the channel access priority class and the QCI.

For example, QCI 1, 2, and 4 denote QCI values for services respectively of conversational voice, conversational video (live streaming), and non-conversational video (buffered streaming). When a signal for a service not mapped to the QCI in Table 1 is to be transmitted in the unlicensed band, the transmitting node may select a service and a QCI closest to the QCI of Table 1, and select a channel access priority class therefor.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

According to an embodiment, a defer duration according to a determined channel access priority p, a group CW_p of values or sizes of contention windows, minimum and maximum values CW_min,p and CW_max,p of the contention window, and a maximum channel occupancy possible section T_mcot,p may be determined via Table 2. Table 2 shows the above values according to the channel access priority class in DL.

In other words, the base station that is to transmit the DL signal in the unlicensed band performs the channel access procedure on the unlicensed band for a time of at least T_f+m_p*T_sl. When the base station is to perform the channel access procedure in a channel access priority class 3 (p-3), a size T_f+m_p*T_sl of a defer duration required to perform the channel access procedure may be configured by using m_p=3. Here, T_f is a value fixed to 16 us, a first T_sl time should be in an idle state, and the base station may not perform the channel access procedure for a remaining time T_f−T_sl after the time T_sl among the time T_f. Here, even when the base station performed the channel access procedure for the remaining time T_f−T_sl, a result of the channel access procedure is not used. In other words, the time T_f−T_sl is a time when the base station defers performing of the channel access procedure.

When it is determined that the unlicensed band is in the idle state for the entire time of m_p*T_sl, N=N−1. Here, N is selected to be any integer value between 0 and the value CW_p of contention window at a time when the channel access procedure is performed. In the channel access priority class 3, a minimum contention window value and a maximum contention window value are respectively 15 and 63. When it is determined that the unlicensed band is in the idle state in the defer duration and an additional channel access procedure performing duration, the base station may transmit a signal via the unlicensed band for the time T_mcot,p (8 ms). Meanwhile, Table 2 shows the channel access priority class in DL. For convenience of description, the present disclosure will be described by using a DL channel access priority class, and the channel access priority class of Table 2 may be reused for UL or a channel access priority class for UL transmission may be defined to be used.

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value CW_p is the minimum value CW_min,p of the contention window. Upon selecting a value N, the base station performs the channel access procedure in a T_sl section, and when it is determined that the unlicensed band is in the idle state via the channel access procedure performed in the T_sl section, changes the value to N=N−1. When N=0, the base station may transmit a signal for the maximum time T_mcot,p via the unlicensed band. When it is determined that the unlicensed band is not in the idle state via the channel access procedure in the T-sl section, the value of N is not changed and the channel access procedure may be performed again.

The value of contention window CW_p may be changed or maintained according to a proportion Z of NACK in reception results (ACK/NACK) for DL data transmitted or reported (received in a reference subframe or reference slot) to the base station by at least one terminal that received the DL data transmitted via a DL data channel from the reference subframe or reference slot. Here, the reference subframe or reference slot may be determined to be a DL signal transmission section (or MCOT) most recently transmitted by the base station via the unlicensed band at a time when the base station initiates the channel access procedure, a time when the base station selects the value of N to perform the channel access procedure, or immediately before the two times.

Figure 2:
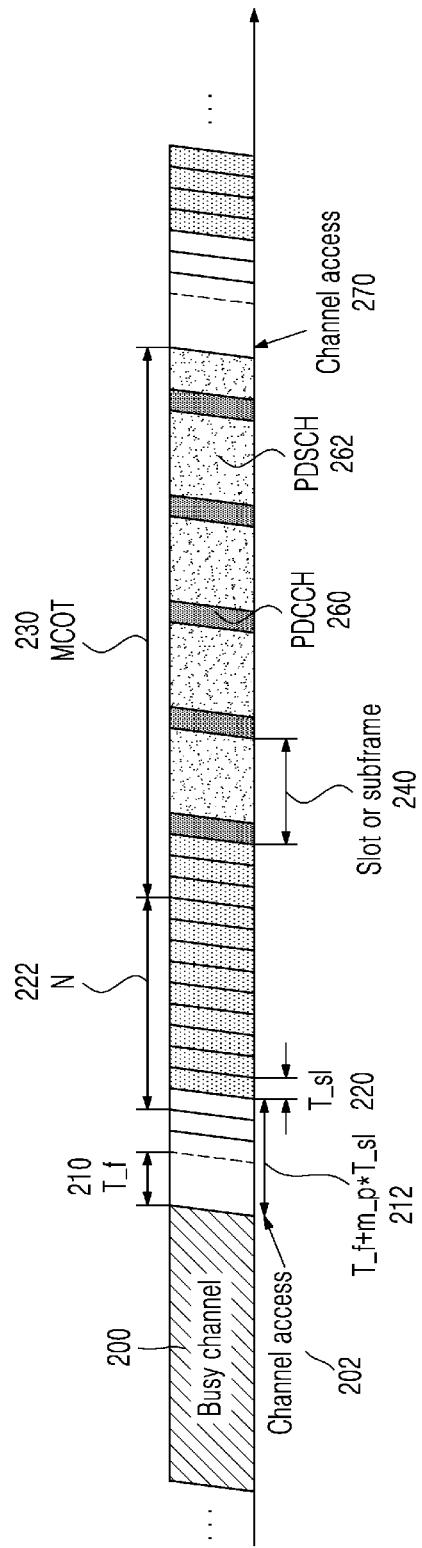
FIG. 2 is a diagram of a channel access procedure in an unlicensed band, according to an embodiment.

FIG. 2 is a diagram of a channel access procedure in an unlicensed band, according to an embodiment.

Referring to FIG. 2, a first slot or subframe 240 of a channel occupancy time (COT) 230 most recently transmitted by a base station via an unlicensed band at a time 270 when the base station initiates a channel access procedure, or a time when the base station selects a value of N to perform the channel access procedure or immediately before may be defined to be a reference slot or reference subframe. In particular, a subframe including the first slot or subframe where a signal is transmitted from at least the entire slots or subframes in the COT 230 may be defined to be the reference slot or reference subframe. When the COT 230 starts after a first symbol of a slot or subframe, a first subframe where a signal is transmitted from a slot or subframe and entire subframes where DL signal transmission starts may be defined to be the reference slot or reference subframe. When a proportion of NACK in reception results for DL data transmitted or reported to the base station by at least one terminals that received the DL data transmitted via a DL data channel in the reference slot or reference subframe is equal to or greater than Z, the base station may perform a channel access procedure by determining a value or size of contention window used for the channel access procedure of the corresponding base station as a next larger contention window than a contention window used for a previous channel access procedure, i.e., by increasing the contention window size.

When the base station is unable to receive a report on a reception result for the DL data channel transmitted from the first slot or subframe, for example, when a time interval between the first subframe and the time 270 when the base station initiates the channel access procedure is equal to or less than n slots or subframes (i.e., when the base station initiates the channel access procedure before a time when the terminal is able to report the reception result for the DL data channel with respect to the first subframe), the first frame of a most recent COT transmitted before the COT 230 becomes the reference subframe.

In other words, when the base station is unable to receive, from the terminal, the reception result for the DL data transmitted from the subframe 240 at the time 270 when the base station initiates the channel access procedure, or the time when the base station selects the value of N to perform the channel access procedure or immediately before, the base station may determine, as the reference subframe, the first subframe of the COT most recently transmitted from among reception results for the DL data channels pre-received from the terminals. Also, the base station may determine the size of a contention window used for the channel access procedure 270 by using the reception results for the DL data received from the terminals with respect to the DL data transmitted via the DL data channel in the reference subframe.

For example, the base station that transmitted a DL signal via the channel access procedure (for example, CW_p=15) configured via the channel access priority class 3 (p=3) may increase a contention window from the initial value (CW_p=15) to a next contention window value (CW_p-31) when at least 80% of the reception results of the terminal for the DL data transmitted to the terminal via the DL data channel in the first subframe among DL signals transmitted through the unlicensed band are determined to be NACK.

When at least 80% of the reception results of the terminals are not determined to be NACK, the base station may maintain the value of the contention window to an existing value or change the value of the contention window to the initial value of the contention window. Here, the changing of the contention window may be applied commonly to all channel access priority class or applied only to a channel access priority class used in the channel access procedure. A method of determining a reception result effective in determining a change in the size of the contention window from among the reception results for the DL data transmitted or reported to the base station by the terminal with respect to the DL data transmitted via the DL data channel from the reference subframe or reference slot for determining the change in the size of the contention window, i.e., a method of determining the value of Z, is as follows.

In a case where the base station transmits at least one codeword or TB to at least one terminal from the reference subframe or reference slot, the base station may determine the value of Z to be the proportion of NACK in the reception results transmitted or reported by the terminal with respect to a TB received from the reference subframe or reference slot. For example, when two codewords or two TBs are transmitted to one terminal from the reference subframe or reference slot, the base station receives or is reported, from the terminal, reception results of DL data signals for the two TBs. When the proportion (Z) of NACK in the two reception results is equal to or greater than a threshold value (for example, Z=80%) pre-defined or configured between the base station or terminal, the base station may change or increase the size of the contention window.

Here, when the terminal bundles the reception results of DL data for one or more subframes (for example, M subframes) including the reference subframe or reference slot, and reports or transmits the same to the base station, the base station may determine that the terminal transmitted M reception results. Then, the base station may determine the value of Z to be the proportion of NACK in the M reception results, and change, maintain, or initialize the size of contention window.

When the reference subframe is a reception result for a second slot from among two slots configuring one subframe, the value of Z may be determined to be the proportion of NACK in reception results transmitted or reported to the base station by the terminal for DL data received in the reference subframe (i.e., the second slot) and a next subframe.

Also, in a case where scheduling information or DCI for the DL data channel transmitted by the base station is transmitted in a cell or frequency band identical to a cell or frequency band where the DL data channel is transmitted or where the scheduling information or DCI for the DL data channel transmitted by the base station is transmitted via the unlicensed band or in a cell or frequency different from a cell where the DL data channel is transmitted, the base station may determine the value of Z by determining a reception result of the terminal to be NACK when it is determined that the terminal did not transmit the reception result for the DL data received from the reference subframe or reference slot and when the reception result for the DL data transmitted by the terminal is determined to be at least one of discontinuous transmission (DTX), NACK/DTX, or any state.

Also, in a case where the scheduling information or DCI for the DL data channel transmitted by the base station is transmitted via a licensed band, the base station may not include a reception result of the terminal to the value of Z, i.e., a reference value for changing the contention window, when the reception result for the DL data transmitted by the terminal is determined to be at least one of DTX, NACK/DTX, or any state. In other words, the base station may determine the value of Z while ignoring the reception result of the terminal.

Also, in a case where the base station transmits the scheduling information or DCI for the DL data channel via the licensed band, the base station may determine the value of Z while ignoring the reception result transmitted or reported by the terminal for the DL data when the base station did not actually transmit the DL data (no transmission) among the reception results of DL data for the reference subframe or reference slot transmitted or reported by the terminal to the base station.

Hereinafter, the channel access procedure when the starting time of the channel access procedure of the transmitting device is fixed (FBE) (hereinafter, a frame-based channel access procedure or a channel access procedure) will be described by using FIG. 3.

Figure 3:
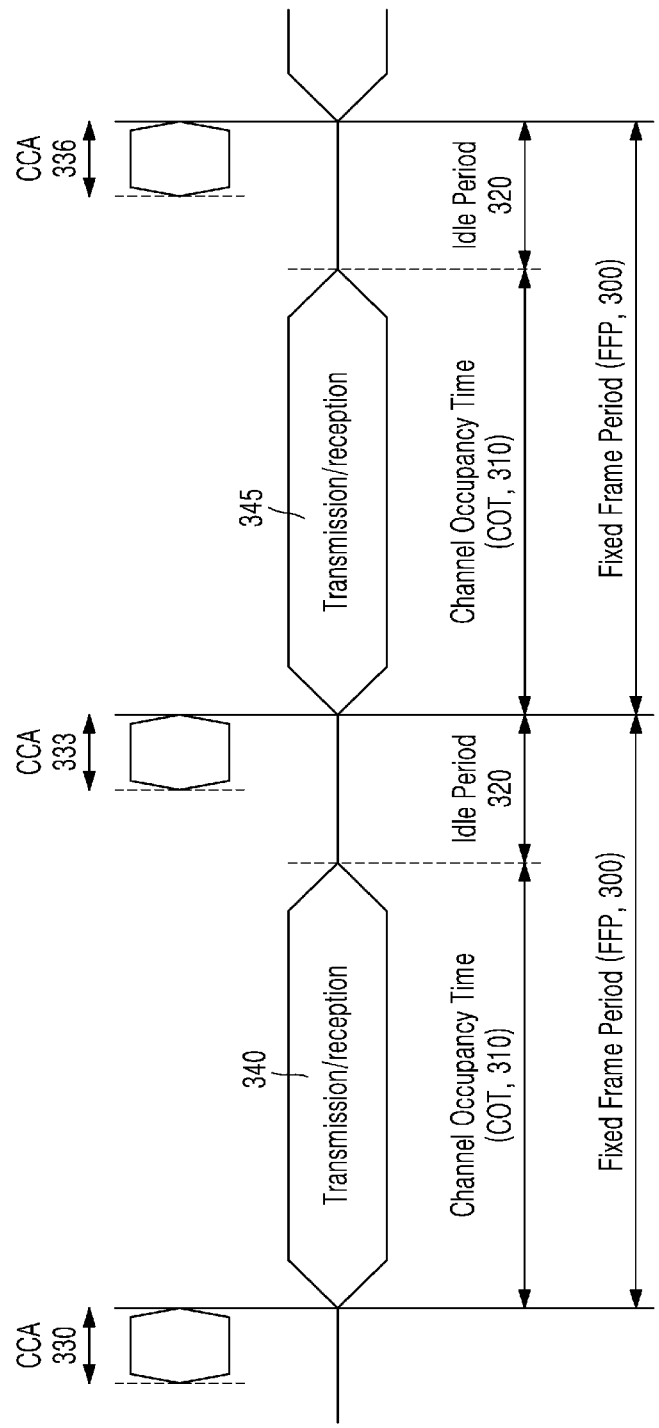
FIG. 3 is a diagram of a channel access procedure in an unlicensed band, according to another embodiment.

FIG. 3 is a diagram of a channel access procedure in an unlicensed band, according to another embodiment.

A device performing a frame-based channel access procedure may transmit or receive a signal periodically according to a fixed frame period (FFP). Here, an FFP 300 may be declared or configured by a transmitting device (for example, a base station), and may be configured from 1 ms to 10 ms. Here, channel access procedures (or clear channel accesses (CCAs) 330, 333, and 336) for an unlicensed band may be performed immediately before each frame period starts, and are performed for a fixed time or one observation slot such as the channel access procedure Type 2 described above. When it is determined that the unlicensed band is in an idle state or is an idle channel according to a result of the channel access procedure, the transmitting device may transmit or receive a signal without performing a separate channel access procedure for a maximum 95% time (hereinafter, a COT 310) of the FFP 300. Here, a minimum 5% time of the FFP 300 is an idle period 320 at which a signal is unable to be transmitted or received, and the channel access procedure may be performed within the idle period 320.

The frame-based channel access procedure is relatively simple in performing the channel access procedure compared to a traffic-based channel access procedure, and is capable of performing a channel access of an unlicensed band. However, because a starting time of the channel access procedure is fixed, a probability of accessing the unlicensed band may be low compared to the traffic-based channel access procedure.

In the 5G system, a frame structure needs to be flexibly defined and operated considering various services and requirements. For example, the services may have different subcarrier spacings based on the requirements. Equation 1 below may be used to determine a method of supporting a plurality of subcarrier spacings in the current 5G communication system.

$$\Delta f = f_0 2^m$$ [Equation 1]

Here, $f_0$ indicates a base subcarrier spacing of a system and m denotes a scaling factor of an integer. For example, when $f_0$ is 15 kHz, a set of subcarrier spacings of the 5G communication system may include 3.75 kHz, 7.5 kHz, 15 kHz, 30 kHz, 60 kHz, 120 kHz, 240 kHz, and 480 kHz. An available subcarrier spacing set may vary according to frequency bands. For example, 3.75 kHz, 7.5 kHz, 15 kHz, 30 kHz, and 60 kHz may be used in a frequency band smaller than or equal to 6 GHz, and 60 kHz, 120 kHz, and 240 kHz may be used in a frequency band equal to or greater than 6 GHz.

According to an embodiment, a length of OFDM symbol may vary according to a subcarrier spacing constituting the OFDM symbol. This is because the subcarrier spacing and the length of the OFDM symbol have a reciprocal relationship with each other. For example, when the subcarrier spacing is doubled, the symbol length is shortened by half, and when the subcarrier spacing is reduced by ½, the symbol length is doubled.

Figure 4:
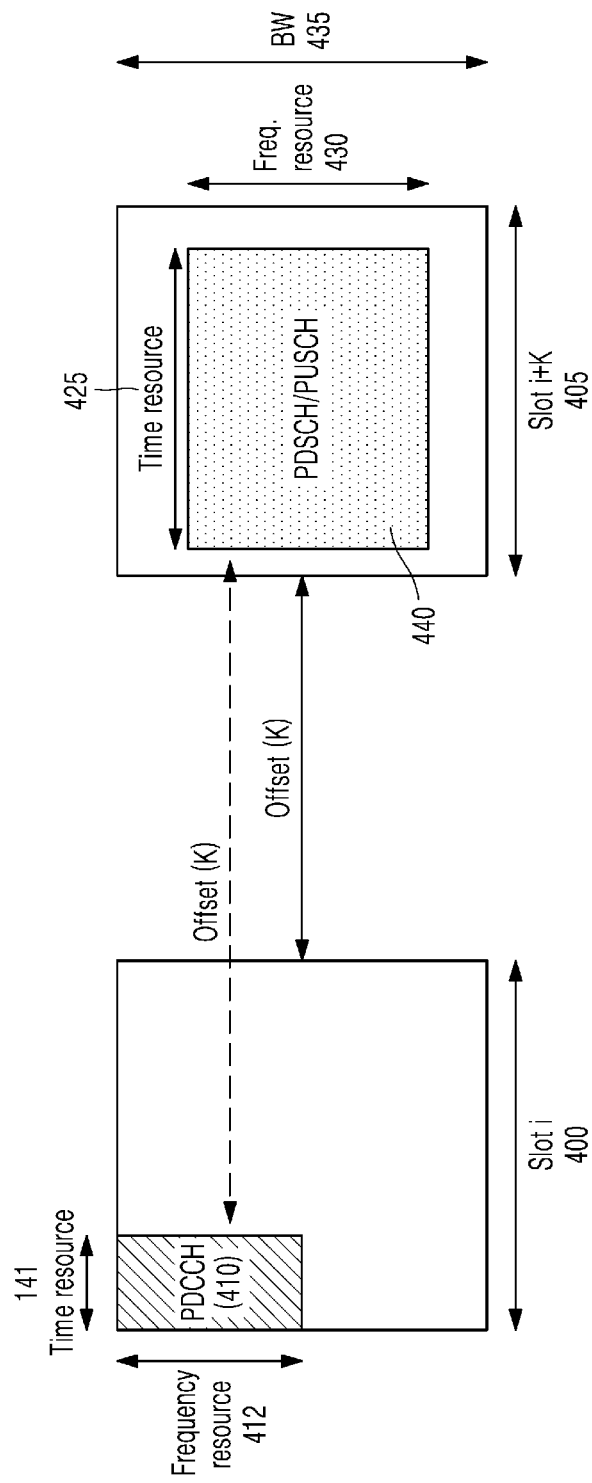
FIG. 4 is a diagram of a downlink and uplink scheduling methods and resource regions in an NR system, according to an embodiment.

FIG. 4 is a diagram of a DL and UL scheduling methods and resource regions in an NR system, according to an embodiment.

Referring to FIG. 4, a resource region where a data channel is transmitted in a 5G or NR communication system is illustrated. A terminal monitors or searches for a PDCCH 410 in a DL control channel (hereinafter, PDCCH) region (hereinafter, a control resource set (CORESET) or search space (SS)) configured by a base station via a higher layer signal. Here, the DL control channel region includes a time resource 414 and a frequency resource 412, wherein the time resource 414 may be configured in units of symbols and the frequency resource 412 may be configured in units of RBs or units of groups of RBs.

When the terminal detected the PDCCH 410 in a slot i 400, the terminal obtains DCI transmitted via the detected PDCCH 410. Through the received DCI, the terminal may obtain scheduling information on a DL data channel or a UL data channel. In other words, the DCI may include at least resource region (or PDSCH transmission region) information for receiving, by the terminal, DL data channel (hereinafter, PDSCH) transmitted from the base station or resource region information assigned to the terminal from the base station to transmit UL data channel (PUSCH).

An example in which the terminal is scheduled with the UL data channel (PUSCH) transmission will be described. Upon receiving the DCI, the terminal may obtain a slot index or offset information K for receiving the PUSCH via the DCI and determine a PUSCH transmission slot index. For example, the terminal may determine that the PUSCH is scheduled to be transmitted in a slot i+K 405 through the received offset information K, based on the slot i 400 where the PDCCH 410 is received. Here, the terminal may determine the slot i+K 405 or a PUSCH start symbol or time in the slot i+K 405 via the received offset information K, based on CORESET where the PDCCH 410 is received.

Also, the terminal may obtain, from the DCI, information about a PUSCH transmission time-frequency resource region 440 in the PUSCH transmission slot 405. PUSCH transmission frequency resource region information 430 may include a physical resource block (PRB) or group unit information of PRB. Meanwhile, the PUSCH transmission frequency resource region information 430 may be a region including an initial UL bandwidth (BW) or initial UL bandwidth part (BWP) determined or configured by the terminal via an initial access procedure. When the terminal is configured with a UL BW or UL BWP via a higher layer signal, the PUSCH transmission frequency resource region information 430 may be a region included in the UL BW or UL BWP configured via the higher layer signal.

According to an embodiment, PUSCH transmission time resource region information 425 may be a symbol or group unit information of symbols, or may be information indicating absolute time information. The PUSCH transmission time resource region information 425 may be included in the DCI as one field or value by being expressed in a combination of a PUSCH transmission start time or symbol and a PUSCH length or a PUSCH end time or symbol. Here, the PUSCH transmission time resource region information 425 may be included in the DCI as a field or value representing each of the PUSCH transmission start time or symbol and the PUSCH length or the PUSCH end time or symbol. The terminal may transmit the PUSCH from the PUSCH transmission resource region 440 determined via the DCI.

In the 5G communication system, it may be indicated whether each of OFDM symbols configuring one slot is a DL symbol, a UL symbol, or a flexible symbol via a slot format indicator (SFI) so as to dynamically change DL signal transmission and UL signal transmission sections in a time-division duplex (TDD) system. Here, a symbol indicated as a flexible symbol denotes a symbol that is neither DL symbol nor UL symbol, or a symbol that may be changed to a DL or UL symbol according to terminal-specific control information or scheduling information. Here, the flexible symbol may include a gap guard required for a process of switching from DL to UL.

The SFI is simultaneously transmitted to a plurality of terminals via a terminal group (or cell)-common control channel. In other words, the SFI is CRC-scrambled by another identifier (e.g., SFI-RNTI) different from C-RNTI and then is transmitted via the PDCCH. According to an embodiment, the SFI may include information about N slots, wherein a value of N may be an integer or natural number greater than 0 or may be a value configured by the base station to the terminal via a higher layer signal from among a set of pre-definable values such as 1, 2, 5, 10, and 20. Also, the size of SFI may be configured by the base station to the terminal via a higher layer signal. Examples of slot formats indicatable by the SFI are shown in Table 3.

TABLE 3

| Format | \multicolumn{14}{c}{Symbol Number (or Index) in One Slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | D | D | D | D | D | D | X | X |
| 48 | D | D | X | X | X | X | D | D | X | X | X | X | X | X |
| 49 | X | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | X | U | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-254 | \multicolumn{14}{c}{Reserved} |

TABLE 3-continued

| | Symbol Number (or Index) in One Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In Table 3, D denotes a DL, U denotes a UL, and X denotes a flexible symbol. The total number of supportable slot formats in Table 3 is 256. In the current NR system, a maximum size of an SFI information bit is 128 bits and the SFI information bit may be a value configurable by the base station to the terminal via a higher layer signal (for example, dci_PayloadSize).

According to an embodiment, SFI information may include a slot format regarding a plurality of serving cells and may be distinguished via serving cell ID. Also, a combination of SFIs (a slot format combination) for one or more slots may be included with respect to each serving cell. For example, when the size of SFI information bit is 3 bits and is configured of SFI for one serving cell, the SFI information of 3 bits may configure total 8 SFIs or a SFI combination (hereinafter, SFI), and the base station may instruct one SFI among the 8 SFIs via the terminal group-common control information (group common DCI, hereinafter, referred to as SFI information).

According to an embodiment, at least one SFI among the 8 SFIs may be configured of an SFI regarding a plurality of slots. For example, Table 4 shows examples of 3-bit SFI information configured of a slot format of Table 3. 5 pieces of information (slot format combination IDs 0, 1, 2, 3, and 4) among the SFI information are an SFI for one slot, and the remaining 3 pieces of information are information about SFI (slot format combination IDs 5, 6, and 7) for 4 slots, which are sequentially applied to 4 slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal receives configuration information on the PDCCH for detecting the SFI information via a higher layer signal, and detects the SFI according to configuration. For example, the terminal is configured, via a higher layer signal, with CORESET configuration for detecting the SFI information, search space configuration, RNTI information used for CRC-scrambling of the DCI in which the SFI information is transmitted, and period and offset information of a search space.

Figure 5:
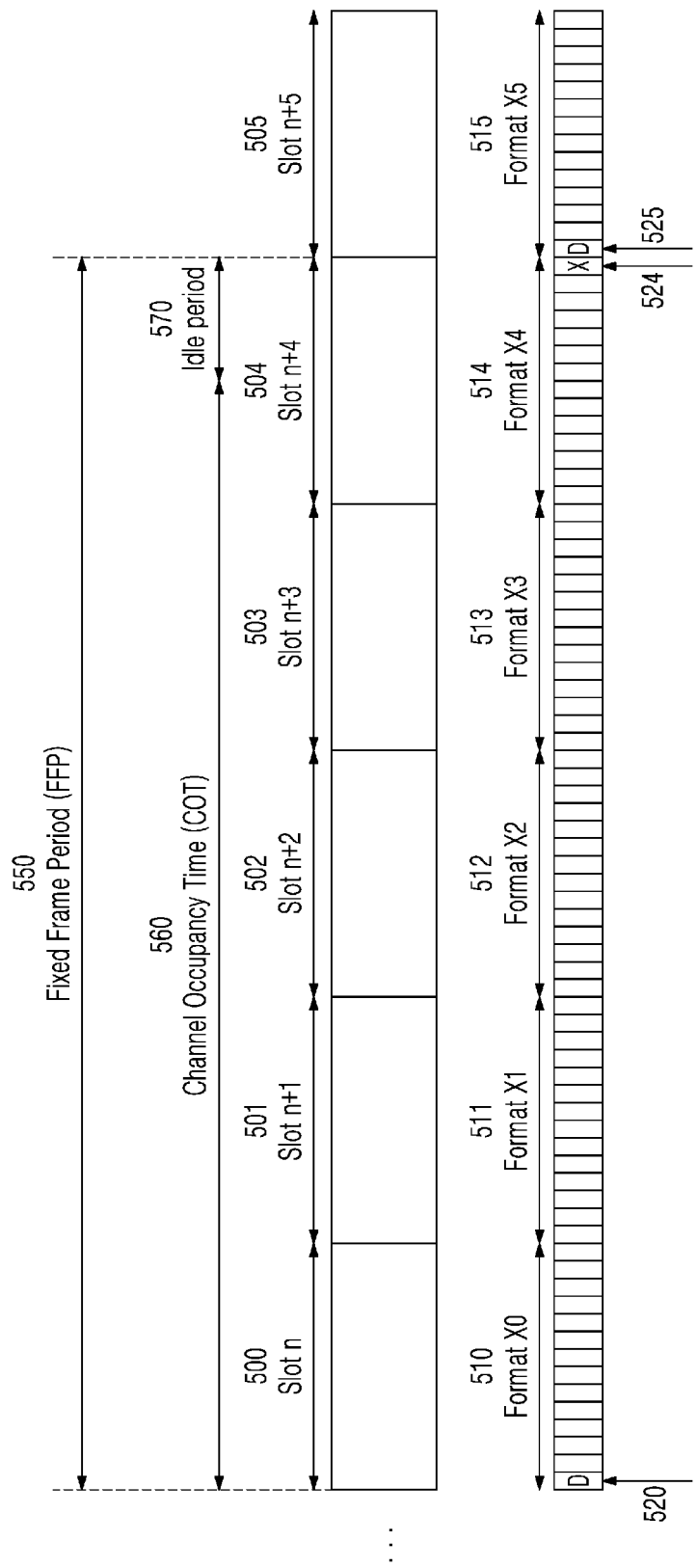
FIG. 5 is a diagram of a channel occupancy time according to an embodiment.

FIG. 5 is a diagram of a channel occupancy time according to an embodiment.

FIG. 5 illustrates PDCCH regions 520, 522, and 524 where a terminal needs to detect SFI information, and a case in which periods of the PDCCH regions 520, 522, and 524 (삽입) are 2 slots. In other words, the terminal detects DCI that is CRC-scrambled by an SFI identifier (hereinafter, SFI-RNTI) from the PDCCH regions 520, 522, and 524 in slots n, n+2, and n+4 500, 502, and 504, according to the configured PDCCH regions 520, 522, and 524 and periods thereof, and may obtain an SFI for two slots via the detected DCI. Here, the detected DCI may include SFI information for two or more slots, and the number of slots in the SFI may be configured via a higher layer signal. Configuration information about the number of slots in the SFI may be included in a higher layer signal that is the same as a higher layer signal configuring the SFI information. For example, in FIG. 5, the terminal obtained SFI information 510 and 511 for the slots n and n+1 500 and 501 in the PDCCH region 520 of the slot n 500. Here, SFI information 510, 511, 512, 513, and 514 denote the formats of Table 3.

When the SFI information is transmitted in an unlicensed band, in particular, when the SFI information includes SFIs for a plurality of slots, it may not be possible for a base station to determine the SFI information for at least one slot, according to a channel access of the unlicensed band. In other words, in FIG. 5, when the base station performs a channel access procedure on the unlicensed band before the slot n 500, and occupies and uses a channel from the slot n 500 to the slot n+4 504 by determining an idle channel via the channel access procedure, the base station is unable to determine an SFI of a slot n+5 505 because a result of the channel access procedure in the unlicensed band in the slot n+5 505 is unpredictable. In other words, the base station requires a method of determining the SFI information of the slot n+5 505 when transmitting the SFI information 514 and 515 for the slot n+4 504 and the slot n+5 505 in the PDDCH 524.

Also, the terminal requires a method of determining whether the base station is a base station performing a frame-based channel access procedure or a base station performing a traffic-based channel access procedure. In addition, when the base station is the base station performing the frame-based channel access procedure, the terminal needs to additionally receive, from the base station, information about FFP, COT, and the like declared or configured by the base station. Accordingly, in the present disclosure, a method of determining information, such as COT, via an SFI in an unlicensed band, and a method of transmitting or receiving a signal via determined SFI information will be described.

In the present disclosure hereinafter, a case in which a base station transmits a DL signal to a terminal via an unlicensed band and a case in which the terminal transmits a UL signal to the base station via the unlicensed band will be described together. However, the content proposed in the present disclosure may be applied, identically or with partial modification, to a case in which the terminal transmits the UL signal to the base station via the unlicensed band or a case in which the base station transmits the DL signal to the terminal via the unlicensed band. Accordingly, detailed description about transmission and reception of a DL signal will be omitted. Also, in the present disclosure, a case in which one piece of DL data information (codeword or TB)

or UL data information is transmitted or received between the base station and the terminal will be described. However, the content proposed in the present disclosure may also be applied to a case in which the base station transmits a DL signal to a plurality of terminals or a case in which a plurality of codewords or TBs are transmitted or received between the base station and the terminal. In addition, the content proposed in the present disclosure may also be applied to a case in which the base station or terminal transmits or receives a signal in units of code block groups by grouping one or a plurality of code blocks configuring one TB.

A method and apparatus proposed in embodiments of the present disclosure below are not applied limitedly to each embodiment, and may be used for a method and apparatus for determining SFI information by using a combination of all or some embodiments proposed in the present disclosure. Also, in an embodiment of the present disclosure, a case in which a base station transmits SFI information to a terminal via DCI and the terminal using the received SFI information will be described, but the embodiment may also be applied to a case in which the terminal transmits the SFI information to the base station via uplink control information (UCI) and the base station using the received SFI information. In addition, in an embodiment of the present disclosure, the base station and the terminal operating in an unlicensed band will be described, but the method and apparatus proposed in the embodiment of the present disclosure may also be applied to the base station and the terminal operating not only in the unlicensed band, but also in a licensed band or shared spectrum.

Also, SFI information described in an embodiment of the present disclosure below is assumed to be SFI information transmitted to a specific terminal or a terminal in a specific group via PDCCH, but SFI information (or UL-DL configuration information) transmitted to a terminal via a higher layer signal may also be used.

Also, in an embodiment of the present disclosure below, a case in which a terminal receives a DL data channel (PDSCH) from a base station will be mainly described, but an embodiment proposed in the present disclosure may also be applied to a case in which the terminal transmits a UL data channel (PUSCH) to the base station. Also, a case in which SFIs for a plurality of slots are simultaneously transmitted will be described, but an embodiment proposed in the present disclosure may also be applied to a case in which an SFI for one slot is transmitted.

Also, in an embodiment of the present disclosure below, an SFI indicating whether a symbol included in one or more slots is a UL symbol, a DL symbol, or a flexible symbol may be interchangeably used with SFI or slot configuration information. Also, because an unlicensed band channel occupancy time of a base station or terminal may be notified via the SFI, the SFI may also be referred to as channel occupancy time information.

First Embodiment

According to an embodiment, a method by which a terminal determines whether a channel access procedure of a base station is a frame-based channel access procedure or a traffic-based channel access procedure, in the base station and the terminal operating in an unlicensed band.

The base station using the frame-based channel access procedure may notify the terminal that the channel access procedure of the base station is the frame-based channel access procedure, via a following method. Here, when the terminal does not receive information about the channel access procedure of the base station from the base station, the terminal may determine that the base station is using the traffic-based channel access procedure.

Method 1-1: Transmit via Master Information Block (MIB) of PBCH

Method 1-1 will now be described in detail. The base station may transmit, to the terminal, whether the channel access procedure of the base station is the frame-based channel access procedure or the traffic-based channel access procedure, via an MIB transmitted through a PBCH.

```
MIB ::=                    SEQUENCE {
   ...
   ChannelAccessScheme     ENUMERATED {FBE, LBE}
   ...
}
```

For example, it may be notified to the terminal whether the channel access procedure of the base station is the frame-based channel access procedure or the traffic-based channel access procedure, by adding an indicator of 1 bit to the MIB or by using one of existing MIB bit strings. Then, the terminal may determine the channel access procedure of the base station and perform DL signal reception or UL signal transmission according to the determined channel access procedure. For example, when it is determined that the channel access procedure of the base station is the frame-based channel access procedure, the terminal may transmit a UL signal (for example, a PRACH) by using a channel access procedure (for example, channel access procedure Type 2) used in the frame-based channel access procedure. Here, the terminal may determine whether the UL signal transmission is possible.

Method 1-2: Transmit via System Information Block (SIB)

Method 1-2 will now be described in detail. The base station may transmit, to the terminal, whether the channel access procedure of the base station is the frame-based channel access procedure or the traffic-based channel access procedure, via system information commonly transmitted to a plurality of terminals. In other words, it may be notified to the terminal whether the channel access procedure of the base station is the frame-based channel access procedure or the traffic-based channel access procedure, via a PDSCH transmitted through a DCI that is scrambled by system information RNTI (SI-RNTI). Here, the channel access procedure of the base station may be transmitted via an SIB1 (or RMSI) that is transmitted first or via a SIBx (here, x is a natural number other than 1) including unlicensed band transmission/reception-related configuration information.

For example, whether the channel access procedure of the base station is the frame-based channel access procedure or the traffic-based channel access procedure may be transmitted to the terminal via an additional field to the SIB1 as below.

```
SIB1 ::=    SEQUENCE: {
   ChannelAccessScheme   ENUMERATED {FBE, LBE}   OPTIONAL,   -- Need S
   ...
}
```

As another example, whether the channel access procedure of the base station is the frame-based channel access procedure or the traffic-based channel access procedure may be transmitted to the terminal via an additional field to the SIB1 as below. According to an embodiment, when a value of the field is true, the channel access procedure of the base station is the frame-based channel access procedure and when the value is false, the channel access procedure of the base station is the traffic-based channel access procedure.

```
SIB1 ::=     SEQUENCE {
   FramebasedEquipment    ENUMERATED {true}    OPTIONAL,    -- Need S
   ...
}
```

As another example, whether the channel access procedure of the base station is the frame-based channel access procedure or the traffic-based channel access procedure may be transmitted to the terminal via an additional field to the SIB1 as below. According to an embodiment, when a value of the field is enabled, the channel access procedure of the base station is the frame-based channel access procedure and when the value is false, the channel access procedure of the base station is the traffic-based channel access procedure.

```
SIBI ::=     SEQUENCE {
   FramebasedEquipment    ENUMERATED {enabled}    OPTIONAL,    -- Need S.
   ...
}
```

Then, the terminal may determine the channel access procedure of the base station and perform DL signal reception or UL signal transmission according to the determined channel access procedure. For example, when it is determined that the channel access procedure of the base station is the frame-based channel access procedure, the terminal may transmit a UL signal (for example, a PRACH) by using a channel access procedure (for example, channel access procedure Type 2) used in the frame-based channel access procedure. Here, the terminal may determine whether the UL signal transmission is possible.

Method 1-3: Transmit via Random Access Response (RAR) Grant

Method 1-3 will now be described in detail. The base station may transmit whether the channel access procedure of the base station is the frame-based channel access procedure or the traffic-based channel access procedure to the terminal via RAR grant scheduling msg3 PUSCH transmission that is one of response messages regarding initial access procedure of the terminal.

Table 5 shows RAR grant field information and a size thereof. For example, as shown in Table 5, the base station may transmit, to the terminal, whether the channel access procedure of the base station is the frame-based channel access procedure or the traffic-based channel access procedure, via an additional field to the RAR grant.

TABLE 5

| RAR grant field | Number of bits |
| --- | --- |
| Frequency hopping flag | 1 |
| Msg3 PUSCH frequency | 14 |

TABLE 5-continued

| RAR grant field | Number of bits |
| --- | --- |
| resource allocation | |
| Msg3 PUSCH time | 4 |
| resource allocation | |
| MCS | 4 |
| TPC command for Msg3 PUSCH | 3 |

TABLE 5-continued

| RAR grant field | Number of bits |
| --- | --- |
| CSI request | 1 |
| Channel access scheme | 1 |

Upon receiving the RAR grant, the terminal may determine the channel access procedure of the base station and perform DL signal reception or UL signal transmission according to the determined channel access procedure. For example, when it is determined that the channel access procedure of the base station is the frame-based channel access procedure, the terminal may transmit a UL signal (for example, an Msg3 PUSCH) by using a channel access procedure (for example, channel access procedure Type 2) used in the frame-based channel access procedure. Here, the terminal may determine whether the UL signal transmission is possible.

Method 1-4: Transmit via RRC Signaling

Method 1-4 will now be described in detail. The base station may transmit, to the terminal, whether the channel access procedure of the base station is the frame-based channel access procedure or the traffic-based channel access procedure, via a higher layer signal. For example, the base station may transmit, to the terminal, a 1-bit field as in Method 1-2 by adding the 1-bit field to the higher layer signal including the unlicensed band transmission/reception-related configuration information.

Then, the terminal may determine the channel access procedure of the base station and perform DL signal reception or UL signal transmission according to the determined channel access procedure. For example, when it is determined that the channel access procedure of the base station is the frame-based channel access procedure, the terminal may transmit a UL signal (for example, a PUCCH, PUSCH) by using a channel access procedure (for example, channel access procedure Type 2) used in the frame-based channel access procedure. Here, the terminal may determine whether the UL signal transmission is possible.

When it is pre-defined with the terminal that the traffic-based channel access procedure is a default channel access procedure of the base station, the base station may notify the channel access procedure of the base station to the terminal only when the frame-based channel access procedure is used. Here, when the terminal does not receive information about the channel access procedure of the base station from the base station, the terminal may determine that the base station is using the traffic-based channel access procedure. Here, even when it is not pre-defined with the terminal that the traffic-based channel access procedure is the default channel access procedure of the base station, the terminal may determine that the base station is using the traffic-based channel access procedure when information about the channel access procedure of the base station is not received from the base station.

Second Embodiment

In an embodiment, a method by which a base station transmits frame-based channel access procedure configuration information including configuration information of at least one of an FFP, a COT, and a fixed frame start slot offset and a terminal that received the configuration information determines a fixed frame structure of the base station when a channel access procedure of the base station is a frame-based channel access procedure, in the base station and the terminal operating in an unlicensed band will be described.

First, FFP information of the base station may be transmitted to the terminal via a following method.

Method 2-1: Transmit FFP of Base Station by using TDD UL-DL Pattern Information

Method 2-1 will now be described in detail. Through the first embodiment described above, the base station may transmit, to the terminal, whether the channel access procedure of the base station is the frame-based channel access procedure or a traffic-based channel access procedure. Upon receiving or determining that the channel access procedure of the base station is the frame-based channel access procedure, the terminal may determine the FFP of the base station via TDD-UL-DL-Pattern information transmitted through SIB1 or TDD-UL-DL-SlotConfig information transmitted through an RRC signal.

A method of determining the FFP of the base station via the TDD-UL-DL-Pattern information transmitted through the SIB1 is as follows. An example of the TDD-UL-DL-Pattern information transmitted through the SIB1 is as below.

```
TDD-UL-DL-ConfigCommon ::- SEQUENCE {
    referenceSubcarrierSpacing    SubcarrierSpacing,
    pattern1                      TDD-UL-DL-Pattern,
    pattern2                      TDD-UL-DL-Pattern
    . . .
}
TDD-UL-DL-Pattern ::=             SEQUENCE {
    dl-UL-TransmissionPeriodicity ENUMERATED {ms0p5, ms0p625, ms1, ms1p25, ms2, ms2p5, ms5, ms10},
    nrofDownlinkSlots             INTEGER (0 . . . maxNrofSlots),
    nrofDownlinkSymbols           INTEGER (0 . . . maxNrofSymbols-1),
    nrofUplinkSlots               INTEGER (0 . . . maxNrofSlots) .
    nrofUplinkSymbols             INTEGER (0 . . . maxNrofSymbols-1),
    . . .
}
```

Upon receiving or determining that the channel access procedure of the base station is the frame-based channel access procedure, the terminal may determine a value of dl-UL-TransmissionPeriodicity that is transmitted through a pattern 1 transmitted via the TDD-UL-DL-Pattern information to be the FFP. When the TDD-UL-DL-Pattern information includes both the pattern 1 and a pattern 2, the terminal may determine that a sum of the dl-UL-TransmissionPeriodicity of the pattern 1 and dl-UL-TransmissionPeriodicity of the pattern 2 is the FFP. Here, the value of dl-UL-TransmissionPeriodicity is an example and may vary as below according to a value of the FFP.

```
TDD-UL-DL-Pattern ::=             SEQUENCE {
    dl-UL-TransmissionPeriodicity ENUMERATED {ms1, ms2, ms3, ms4, ms5, ms6, ms7, ms8, ms9, ms10},
    . . .
}
```

A method of determining the FFP of the base station via the TDD-UL-DL-SlotConfig information transmitted through the RRC signal is as follows. An example of the TDD-UL-DL-SlotConfig information transmitted through the RRC signal is as below.

```
TDD-UL-DL-SlotConfig ::=      SEQUENCE {
  slotindex                     TDD-UL-DL-SlotIndex,
  symbols                       CHOICE {
    allDownlink                   NULL,
    alluplink                     NULL,
    explicit                      SEQUENCE {
      nrofDownlinkSymbols           INTEGER
                                    (1 ... maxNrofSymbols-1)
      nrofUplinkSymbols             INTEGER
                                    (1 ... maxNrofSymbols-1)
    }
  }
}
```

Upon receiving or determining that the channel access procedure of the base station is the frame-based channel access procedure, the terminal may determine the FFP via slot format information transmitted through the TDD-UL-DL-SlotConfig information. In detail, the TDD-UL-DL-SlotConfig information is slot format information regarding a slot within a 10 ms period, i.e., information indicating or configuring, to the terminal, whether the corresponding slot is a slot configured only of DL symbols (allDownlink), a slot configured only of UL symbols (allUplink), or a slot configured of a DL symbol and a UL symbol (explicit). Here, the terminal may determine that a slot of which a slot format is not indicated via the TDD-UL-DL-SlotConfig information is a flexible slot.

Accordingly, the base station may transmit the FFP information of the base station to the terminal by using the slot format information transmitted via the TDD-UL-DL-SlotConfig information. For example, the base station may transmit, to the terminal, the FFP information by indicating that a first slot (or a first symbol in the first slot) where the FFP starts, i.e., a first slot of every FFP, to be a DL slot (or at least $A^{th}$ symbol of the corresponding slot (for example, a first symbol) to be a DL symbol) via the TDD-UL-DL-SlotConfig information, and by indicating that a last slot or a $B^{th}$ symbol (for example, a last symbol) of the last slot of the FFP to be a flexible slot or a flexible symbol.

This will be described in detail with reference to FIG. 5. FIG. 5 illustrates an embodiment in which a 15 kHz subcarrier spacing and an FFP 550 of the base station are 5 ms. The base station may indicate or configure, to the terminal, that slot formats of a slot index n slot and a slot index n+5 slot, which are first slots of the FFP, are DL slots via the TDD-UL-DL-SlotConfig information. Here, the base station may indicate or configure, to the terminal, that a first symbol 520 of the slot index n slot and a first symbol 525 of the slot index n+5 slot, which are the first slots of the FFP, are DL symbols.

Here, the base station may instruct or configure the slot formats 511 through 514 for the slots 501 through 504 in the FFP by including the first slot of the FFP, but should not instruct a slot format for the last slot 504 of the FFP or a slot format for a last $B^{th}$ slot or after of the last slot 504 of the FFP. In other words, the base station may indicate that the slot format for at least the last symbol of the FFP is flexible such that the terminal determines the FFP of the base station by using the slot format information. As another example, when the 15 kHz subcarrier spacing and the FFP of the base station are 10 ms, the base station may indicate or configure, to the terminal, that slot formats of a slot index 0 slot and a slot index 9 slot are respectively a DL slot and a flexible slot, via the TDD-UL-DL-SlotConfig information. Here, the instructing or configuring, to the terminal, that the slot format of the slot index 9 slot is the flexible slot may indicate that slot format information for the slot index 9 slot is not transmitted to the terminal.

Method 2-2: Transmit FFP Information via New Higher Layer Signal

Method 2-2 will now be described in detail. Through the first embodiment described above, the base station may transmit, to the terminal, whether the channel access procedure of the base station is the frame-based channel access procedure or the traffic-based channel access procedure. Upon receiving or determining that the channel access procedure of the base station is the frame-based channel access procedure, the terminal may receive the FFP of the base station via the SIB1 (or SIBx, wherein x is a natural number other than 1) or RRC signaling.

```
FBE-Config ::=           SEQUENCE {
  FixedFramePeriodicity    ENUMERATED {ms1, ms2, ms3, ms4, ms5, ms6, ms7, ms8, ms9, ms10},
  ...
}
```

Then, the terminal may determine the FFP of the base station and perform DL signal reception or UL signal transmission according to the determined FFP. For example, when the channel access procedure of the base station is determined to be the frame-based channel access procedure, the terminal may transmit a UL signal (for example, PUCCH or PUSCH) by using a channel access procedure (for example, channel access procedure Type 2) used in the frame-based channel access procedure during a COT of the FFP of the base station. Here, the terminal may determine whether the UL signal transmission is possible.

Offset information for indicating a location of a slot or symbol where the FFP of the base station starts may be transmitted to the terminal via a following method.

Method 2-3: Transmit FFP of Base Station by using Fixed Time Period

Method 2-3 will now be described in detail. A slot or symbol where the FFP indicated or configured via Method 2-1 or 2-2 described above starts may be determined by using a specific time period value. For example, it may be assumed that the FFP indicated or configured via Method 2-1 or 2-2 starts assuming an X ms fixed period. In other words, the terminal may determine that the FFP starts from a slot where a result of a modulo operation on an X period and the FFP indicated or configured in Method 2-1 or 2-2 is 0 or a slot where a remainder between the FFP and the X period is 0.

Method 2-4: Transmit FFP Information via New Higher Layer Signal

Method 2-4 will now be described in detail. A slot or symbol where the FFP indicated or configured via Method 2-1 or 2-2 described above starts may be determined by using a specific reference time. Here, the reference time or offset information indicating a difference in a slot where FFP starts from the reference time may be transmitted to the terminal via SIB or RRC signaling. The reference time or offset may be based on a system frame number (SFN) 0 or based on a slot where a CORESET with lowest CORESET index configured to the terminal to search PDCCH (for example, CORESET index #0) is transmitted or where a synchronization signal used by the terminal to receive the synchronization signal from the base station and obtain synchronization is transmitted.

COT information in the FFP of the base station may be transmitted to the terminal via a following method.

Method 2-5: Determine COT by using TDD UL-DL pattern information.

Method 2-5 will now be described in detail. The base station may transmit the FFP of the base station to the terminal via Method 2-1 or 2-2 described above. Here, the base station may transmit the COT of the base station to the terminal by using the slot format information for the slot in the FFP of the base station. For example, the base station may transmit the slot format information of at least one of a DL slot, a UL slot, or a slot configured of at least one DL or UL symbol for a time (hereinafter, a symbol or slot) to be used as the COT in the FFP, and the terminal that received the slot format information may determine that a slot indicated by the slot format information of at least one of the DL slot, the UL slot, or the slot configured of at least one DL or UL symbol within the FFP of the base station is the COT of the base station. Here, the base station transmits the slot format information of at least one of the DL slot, the UL slot, or the slot configured of at least one DL or UL symbol for a first slot or an $A^{th}$ symbol (for example, a first symbol) of the first slot from among symbols or slots to be used as the COT in the FFP and a last slot of the COT or a $B^{th}$ symbol (for example, a last symbol) or a previous symbol thereof of the last slot. Upon receiving the slot format information, the terminal may determine the slot indicated by the slot format information of at least one of the DL slot, the UL slot, or the slot configured of at least one DL or UL symbol within the FFP of the base station, and determine from a first symbol to a last symbol of the FFP where a slot format is indicated to be the COT of the base station.

Method 2-6: Determine COT by using Subcarrier Spacing and FFP

Method 2-6 will now be described in detail. The base station may transmit the FFP of the base station to the terminal via Method 2-1 or 2-2. Here, the terminal may determine the COT of the base station by using the determined FFP of the base station. For example, the terminal may determine the COT of the base station by using a ratio of the COT in the FFP pre-defined by regulations or configured by the base station. For example, when a maximum COT is limited up to Z % of the FFP, the terminal may determine the FFP determined via Method 2-1 or 2-2 according to Equation 2.

$$COT=FFP*Z/100[ms] \quad \text{[Equation 2]}$$

Here, the COT may be expressed in units of slots or symbols, and maximum slots or symbols that do not exceed the COT calculated according to Equation 2 may be determined to be COT. For example, when the FFP is 10 ms and Z=95%, it may be determined that the COT is 9.5 ms via Equation 2. When the COT is converted in units of slots and/or symbols, the COT corresponds to 9 slots and 7 symbols based on subcarrier spacing of 15 kHz. Via Equation 2, the terminal may determine an idle period of the base station by using a difference between the FFP and the COT.

The COT may be indicated as Table 6 by using the subcarrier spacing and the FFP. Here, the subcarrier spacing is a lowest subcarrier spacing from among subcarrier spacings configured to the terminal or a subcarrier spacing configured in a channel, DL BWP, or UL BWP configured to perform a frame-based channel access procedure. Here, the subcarrier spacing for determining the COT may be pre-defined between the base station and the terminal or may be indicated or configured by the base station to the terminal via a higher layer signal, and subcarrier spacing information may be transmitted by being included in a higher layer signal indicating or configuring transmission/reception configuration of an unlicensed band or a higher layer signal indicating or configuring a frame structure-based channel occupying method. The subcarrier spacing information may be subcarrier spacing information included in the TDD-UL-DL information of Method 2-1 or 2-2 or subcarrier spacing information included in configuration information about the SFI information. Here, the number of symbols in the COT is the number of symbols that may be included in the COT from a first symbol of a slot immediately after the number of slots in the COT of Table 6. As described above, the terminal may determine the COT of the base station by using the subcarrier spacing and FFP information via Equation 2 or Table 6.

TABLE 6

| FFP (ms) | Max COT (ms) | Number of slots in COT | | | Number of symbols in COT | | |
|---|---|---|---|---|---|---|---|
| | | 15 kHz | 30 kHz | 60 kHz | 15 kHz | 30 kHz | 60 kHz |
| 1 | 0.95 | 0 | 1 | 3 | 13 | 12 | 11 |
| 2 | 1.9 | 1 | 3 | 7 | 12 | 11 | 8 |
| 3 | 2.85 | 2 | 5 | 11 | 11 | 9 | 5 |
| 4 | 3.8 | 3 | 7 | 15 | 11 | 8 | 2 |
| 5 | 4.75 | 4 | 9 | 19 | 10 | 7 | 0 |
| 6 | 5.7 | 5 | 11 | 22 | 9 | 5 | 11 |
| 7 | 6.65 | 6 | 13 | 26 | 9 | 4 | 8 |
| 8 | 7.6 | 7 | 15 | 30 | 8 | 2 | 5 |
| 9 | 8.55 | 8 | 17 | 34 | 7 | 1 | 2 |
| 10 | 9.5 | 9 | 19 | 38 | 7 | 0 | 0 |

Method 2-7: Transmit FFP Information via New Higher Layer Signal

Method 2-7 will now be described in detail. The COT information in the FFP indicated or configured via Method 2-1 or 2-2 described above or the slot and/or symbol information included in the COT may be transmitted to the terminal via SIB or RRC signaling.

However, the method of obtaining the COT information in the FFP of the base station is only an example and is not limited thereto. It is possible for the terminal to not only determine the COT information via SIB or higher signaling, but also determine the COT of the base station in the FFP via an SFI transmitted to the terminal via PDCCH. For example, the base station may notify the terminal of the COT of the base station by indicating the slot format information about the symbol and/or slot included in the COT of the base station via DL and/or UL symbol or slot through the SFI transmitted via the PDCCH. In other words, upon receiving the SFI information transmitted via the PDCCH, the terminal may determine that the symbol and/or slot indicated via the DL and/or UL symbol or slot in the SFI information is the COT of the base station.

Third Embodiment

In an embodiment, a method by which a terminal determines whether a base station occupied a channel in a FFP or a method by which the terminal determines whether it is possible to initiate UL signal transmission of the terminal in a COT in the FFP of the base station, when a channel access procedure of the base station is a frame-based channel access procedure, regarding the base station and the terminal operating in an unlicensed band will be described.

As described above, when the frame-based channel access procedure is performed, a time at which the channel access procedure is initiated for the unlicensed band is fixed to immediately before a start of the FFP. In other words, when the base station that performed the channel access procedure for the unlicensed band immediately before the start of the FFP determines that the unlicensed band is not an idle band, the base station is unable to transmit a signal in the FFP. In this case, because the base station did not access the unlicensed band, the terminal should also not transmit a UL signal in the FFP. In other words, the terminal may determine whether to perform UL signal transmission based on a channel access of the base station in each FFP. The terminal may determine the channel access of the base station via a method below.

Method 3-1: Whether PDCCH DMRS is Received

Method 3-1 will now be described in detail. Upon being indicated or determining that the base station is performing the frame-based channel access procedure via the embodiments described above, the terminal may be indicated or receive information such as the FFP, COT, or the like of the base station. The terminal may search a PDCCH transmitted by including a first symbol where the FFP of the base station is initiated to determine the channel access of the base station. Here, determining the channel access of the base station by searching the PDCCH denotes that the terminal determines that the base station accessed a channel in the FFP when the terminal detects or receives DMRS transmitted for channel estimation and decoding of the PDCCH. In other words, when the terminal detects the DMRS of the PDCCH, the terminal determines that the base station accessed a channel in the FFP, and when the terminal does not detect the DMRS, the terminal determines that the base station did not access a channel in the FFP.

When the channel access of the base station is determined by detecting the DMRS of the PDCCH as Method 3-1, a DMRS of a PDCCH transmitted via a CORESET having the lowest CORESET index from among CORESETs performing PDCCH detection by the terminal in a currently activated BWP may be detected. Here, when the channel access of the base station is determined by detecting the DMRS of the PDCCH, a DMRS of a PDCCH transmitted from a specific CORESET (for example, CORESET #0) may be detected. When the terminal determines that the base station was unable to perform an unlicensed band channel access in the FFP via Method 3-1, the terminal does not perform UL signal transmission scheduled or configured in the FFP. When the terminal determines that the base station accessed an unlicensed band channel in the FFP via Method 3-1, the terminal may perform UL signal transmission scheduled or configured in the FFP.

Here, when the terminal detects DCI for scheduling DL signal reception and/or UL signal transmission in a fixed frame section and the DL signal reception and/or UL signal transmission are performed in the fixed frame section, the terminal may perform the DL signal reception and/or UL signal transmission regardless of detection of the DMRS of the PDCCH. In this case, the terminal may not perform an operation (for example, grant-free or configured UL transmission) other than the DL signal reception and/or UL signal transmission scheduled via the DCI. In other words, in the above case, the terminal may perform only the DL signal reception and/or UL signal transmission scheduled via the DCI.

The terminal may determine that the base station accessed the unlicensed band channel when DL or UL scheduling DCI reception for determining that the base station accessed the unlicensed band in the FFP and DL signal reception and/or UL signal transmission scheduled via the received DCI are performed within the same FFP via Method 3-2.

Method 3-2: Whether DCI is Received

Method 3-2 will now be described in detail. Upon being indicated or determining that the base station is performing the frame-based channel access procedure via the embodiments described above, the terminal may be indicated or receive information such as the FFP, COT, or the like of the base station. The terminal may search a PDCCH transmitted by including a first symbol where the FFP of the base station is initiated to determine the channel access of the base station. Here, the determining the channel access of the base station by searching the PDCCH denotes that it is determined that the base station accessed a channel in the FFP when the terminal detected or received DCI indicating or scheduling DL signal reception and/or UL signal transmission. In other words, when the terminal receives the DCI scheduling the DL signal reception or UL signal transmission, the terminal determines that the base station accessed a channel in the FFP, and when the terminal does not receive the DCI scheduling the DL signal reception or UL signal transmission, the terminal may determine that the base station did not access a channel in the FFP.

When the terminal determines that the base station was unable to perform an unlicensed band channel access in the FFP via Method 3-2, the terminal does not perform UL signal transmission scheduled or configured in the FFP. When the terminal determines that the base station accessed an unlicensed band channel in the FFP via Method 3-2, the terminal may perform UL signal transmission scheduled or configured in the FFP. Here, even when the terminal determines that the base station accessed the unlicensed band channel in the FFP via Method 3-2, the DL signal reception and/or UL signal transmission may not be performed when a symbol or slot performing the DL signal reception and/or UL signal transmission and a symbol or slot where the DCI is detected are not bot included in the same FFP. In other words, the terminal may perform the DL signal reception and/or UL signal transmission scheduled via the DCI when a reception symbol or slot of DL or UL scheduling DCI received by the terminal in the FFP via Method 3-2 and the DL signal reception and/or UL signal transmission scheduled via the DCI are within the same FFP. Here, the terminal may not perform an operation (for example, grant-free or configured UL transmission) other than the DL signal reception and/or UL signal transmission scheduled via the DCI.

Method 3-3: Whether SFI is Received

Method 3-3 will now be described in detail. Upon being indicated or determining that the base station is performing the frame-based channel access procedure via the embodiments described above, the terminal may be indicated or receive information such as the FFP, COT, or the like of the base station. The terminal may search a PDCCH transmitted by including a first symbol where the FFP of the base station is initiated to determine the channel access of the base station. Here, the determining the channel access of the base station by searching the PDCCH denotes that the terminal determines that the base station accessed a channel in the FFP when the DCI through which the slot format information transmitted to the terminal is detected or received via the PDCCH. Here, the DCI through which the slot format information is transmitted may be transmitted from a symbol other than a first symbol where the FFP of the base station is initiated, but an embodiment is not limited to including the first symbol. In other words, when the terminal receives the DCI through which the slot format information is transmitted, the terminal determines that the base station accessed a channel in the FFP, and when the terminal does not receive the DCI through which the slot format information is transmitted, the terminal determines that the base station did not access a channel in the FFP.

When the terminal determines that the base station was unable to perform an unlicensed band channel access in the FFP via Method 3-3, the terminal does not perform UL signal transmission scheduled or configured in the FFP. When the terminal determines that the base station accessed an unlicensed band channel in the FFP via Method 3-3, the terminal may perform UL signal transmission scheduled or configured in the FFP. Here, even when the terminal determines that the base station did not access the unlicensed band channel in the FFP via Method 3-3, the terminal may perform DL signal reception and/or UL signal transmission scheduled via the DCI when a symbol or slot for receiving DL or UL scheduling DCI from the base station in the FFP and the DL signal reception and/or UL signal transmission scheduled via the DCI are within the same FFP. Here, the terminal may not perform an operation (for example, grant-free or configured UL transmission) other than the DL signal reception and/or UL signal transmission scheduled via the DCI.

Method 3-4: Whether Pre-defined or Configured Signal is Detected

Method 3-4 will now be described in detail. Upon being indicated or determining that the base station is performing the frame-based channel access procedure via the embodiments described above, the terminal may be indicated or receive information such as the FFP, COT, or the like of the base station. The terminal may determine a channel access of the base station by detecting or receiving a signal periodically transmitted from a specific symbol or slot in the FFP of the base station. For example, the terminal may determine that the base station accessed a channel in the FFP when a synchronization signal block pre-defined or configured in the FFP of the base station is detected or received. When the terminal does not detect or receive the synchronization signal block, the terminal may determine that the base station did not access a channel in the FFP. Here, the determining of the channel access of the base station by using the synchronization signal block is only an example and an embodiment is not limited thereto. For example, the terminal may determine the channel access of the base station by detecting or receiving a CSI-RS, another RS (for example, a phase tracking RS), or preamble pre-defined or configured in the FFP of the base station.

When the terminal determines that the base station was unable to perform an unlicensed band channel access in the FFP via Method 3-4, the terminal does not perform UL signal transmission scheduled or configured in the FFP. When the terminal determines that the base station accessed an unlicensed band channel in the FFP via Method 3-4, the terminal may perform UL signal transmission scheduled or configured in the FFP. Here, even when the terminal determines that the base station did not access the unlicensed band channel in the FFP via Method 3-4, the terminal may perform DL signal reception and/or UL signal transmission scheduled via the DCI when a symbol or slot for receiving DL or UL scheduling DCI from the base station in the FFP and the DL signal reception and/or UL signal transmission scheduled via the DCI are within the same FFP. Here, the terminal may not perform an operation (for example, grant-free or configured UL transmission) other than the DL signal reception and/or UL signal transmission scheduled via the DCI.

Fourth Embodiment

In an embodiment, a method by which a terminal determines whether it is possible to initiate UL signal transmission in an FFP of a base station, when a channel access procedure of the base station is a frame-based channel access procedure, regarding the base station and the terminal operating in an unlicensed band will be described.

This will be described in detail with reference to FIG. 6. The base station performing the frame-based channel access procedure may perform a channel access procedure 690 immediately before an FFP 650 and determine whether the unlicensed band is in an idle state via the performed channel access procedure 690. Upon determining that the unlicensed band is in the idle state, the base station may transmit a DL signal or receive a UL signal from the terminal during a COT 660 by accessing the unlicensed band. Here, the base station may transmit the DL signal or receive the UL signal from the terminal only during a partial time (or a symbol or slot) 663 of the COT 660, and may receive the UL signal from the terminal without transmitting the DL signal during an RCOT 666. Here, transmitting of the UL signal of the terminal during the RCOT 666 may be performed as follows.

Transmitting Method 1: UL signal transmission of the terminal in which the UL signal is transmitted via a transmitting method (hereinafter, grant-free PUSCH transmission) for transmitting a UL data channel without having to receive separate scheduling DCI from the base station Transmitting Method 2: UL signal transmission of the terminal in which a UL signal is transmitted during the COT 663 via a method (hereinafter, grant-based PUSCH or scheduled PUSCH transmission) of transmitting a UL data channel by receiving scheduling DCI from the base station Here, both Transmitting Method 1 and Transmitting Method 2 may be UL signal transmission.

In other words, when the base station is to transmit the DL signal or receive the UL signal from the terminal only during the partial time (or symbol or slot) 663 of the COT 660, and to receive the UL signal from the terminal without separate DL signal transmission during the RCOT 666, the terminal may operate as follows during the RCOT 666.

Terminal 1: A terminal that transmits via a transmitting method (hereinafter, grant-free PUSCH transmission) for transmitting a UL data channel without having to receive separate scheduling DCI from the base station transmits the UL signal Terminal 2: A terminal that transmitted the UL signal during the COT 663, from among terminals that transmitted the UL signal via a method (hereinafter, grant-based PUSCH or scheduled PUSCH transmission) of transmitting a UL data channel by receiving scheduling DCI from the base station, transmits the UL signal Here, both Terminal 1 and Terminal 2 may transmit the UL signal.

At this time, the base station may transmit information about the RCOT 666 in which the DL signal is not transmitted among the COT 660 to the terminal via a following method.

Method 4-1: Transmit RCOT Information via SFI transmitted via PDCCH

Method 4-1 will now be described in detail. The base station may transmit, to the terminal, information about the COT of the base station in the FFP, by using the slot format information of the slot configuring the COT. Here, the slot format information of the slot may be transmitted to the terminal via the SFI that is transmitted via the PDCCH. At this time, the terminal that received the SFI may determine that a slot indicated as a flexible slot in the SFI regarding the received slot is the RCOT. Here, the terminal may determine slots and symbols indicated as flexible continuously from a last slot of which a slot format is indicated via the SFI during the COT 660 in an inverse time order (or an inverse slot index order) to be the RCOT.

Figure 6:
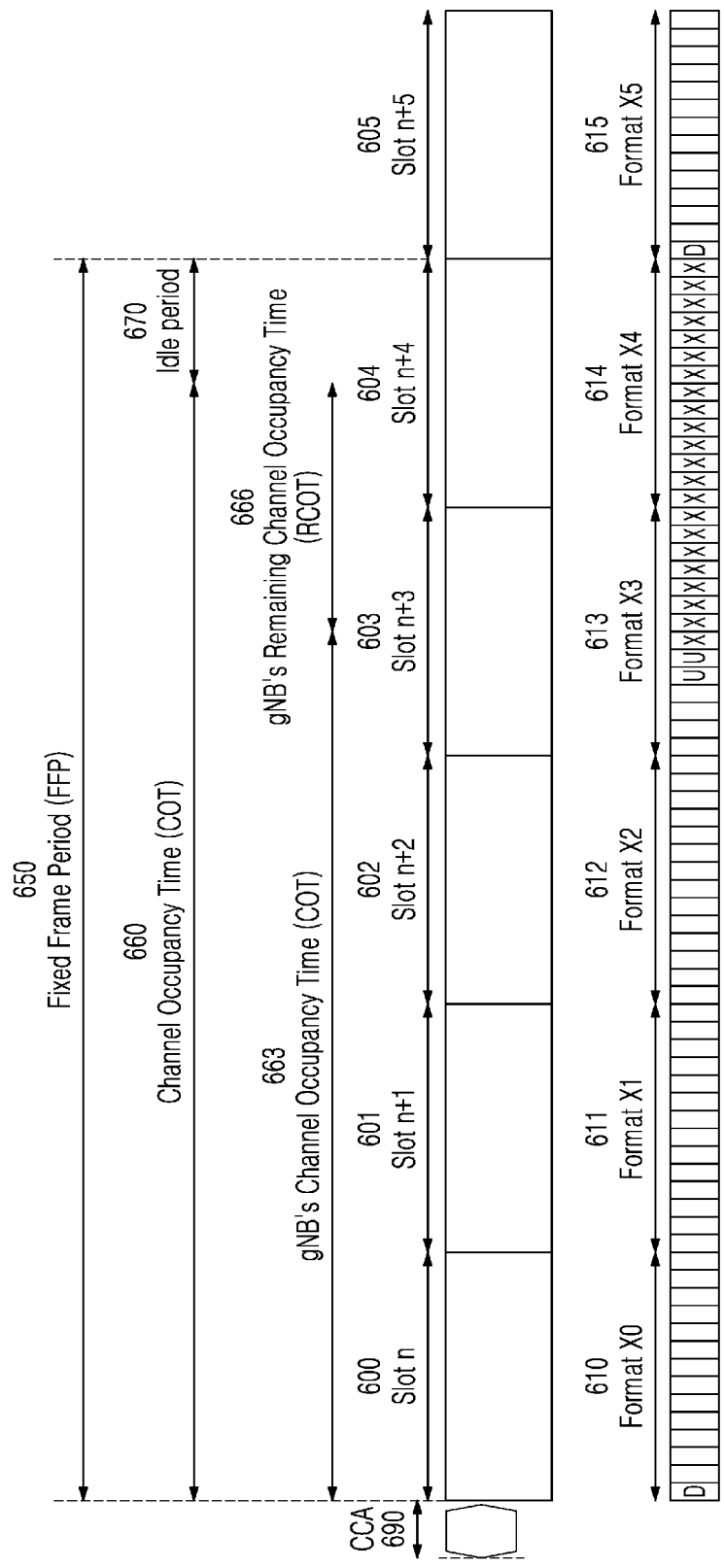
FIG. 6 is a diagram of a remaining channel occupancy time according to an embodiment.

Referring to FIG. 6, the base station may transmit, to the terminal, the information about the COT 660 of the base station in the FFP 650 via pieces of slot format information 610 through 614 of slots configuring the COT 660. The terminal may receive the slot format information and determine the COT 663 and the RCOT 666 according to the received slot format information. In other words, the terminal may identify the slot format information from a last slot 604 from among slots indicated via the slot format information in an inverse time order or an inverse slot index order (604→603→602→601→600), and determine consecutive slots and symbols indicated to be flexible (for example, from a last symbol of slot n+4 to a seventh symbol of a slot n+3) to be the RCOT. In the RCOT 666, the terminal that transmits the UL signal via the transmitting method (hereinafter, grant-free PUSCH transmission) for transmitting the UL data channel without having to separately receive the scheduling DCI from the base station may transmit the UL signal. Here, the terminal that transmitted the UL signal in the COT 663 from among the terminals transmitting the UL signal via the method (hereinafter, grant-based PUSCH or scheduled PUSCH transmission) of transmitting the UL data channel by receiving the scheduling DCI from the base station may transmit the UL signal in the RCOT 666, or both the grant-free PUSCH and grant-based PUSCH transmission terminals may transmit the UL signal.

Hereinabove, a method by which the base station indicates an RCOT as a flexible symbol and the terminal determines the RCOT upon receiving the flexible symbol has been described, but it is possible for the base station to indicate the RCOT as a UL symbol, and the terminal to identify slot format information from a last slot among slots indicated via the slot format information in an inverse order or an inverse slot index order and determine consecutive slots and symbols indicated as UL symbols to be the RCOT.

Method 4-2: Transmit RCOT Information via DCI

Another method by which the base station transmits, to the terminal, information about the RCOT 666 is as follows. The base station may transmit, to the terminal, the RCOT information by adding the RCOT information to a field of DCI where SFI is transmitted or via a field of DCI other than the DCI where the SFI is transmitted. Here, the RCOT information may include slot and symbol information and may be represented as Table 6.

The terminal may perform UL signal transmission in the RCOT 666 by using pre-received scheduling DCI, when the terminal that transmitted the UL signal in the COT 663, from among the terminals that transmitted the UL signal via the method (hereinafter, grant-based PUSCH or scheduled PUSCH transmission) of transmitting the UL data channel by receiving the scheduling DCI from the base station, transmits the UL signal in the RCOT 666. For example, frequency resource region assignment information, time resource region assignment information, a transport block size (TBS), MCS, and the like of the scheduling DCI are maintained, and an HARQ process ID indicated via the DCI may be increased one by one to perform the UL signal transmission.

Referring to FIG. 6, when the terminal that performed PUSCH transmission indicated via HARQ process ID p via the scheduling DCI in the slot n+2 602 is to perform PUSCH transmission in the slot n+4 604 during the RCOT 666, the terminal may perform the PUSCH transmission assuming that the PUSCH transmission in the slot N+4 604 is p+1 increased by one from the HARQ process ID p indicated by UL scheduling information most recently received before the PUSCH transmission or scheduling information about PUSCH most recently transmitted before the PUSCH transmission.

Figure 7:
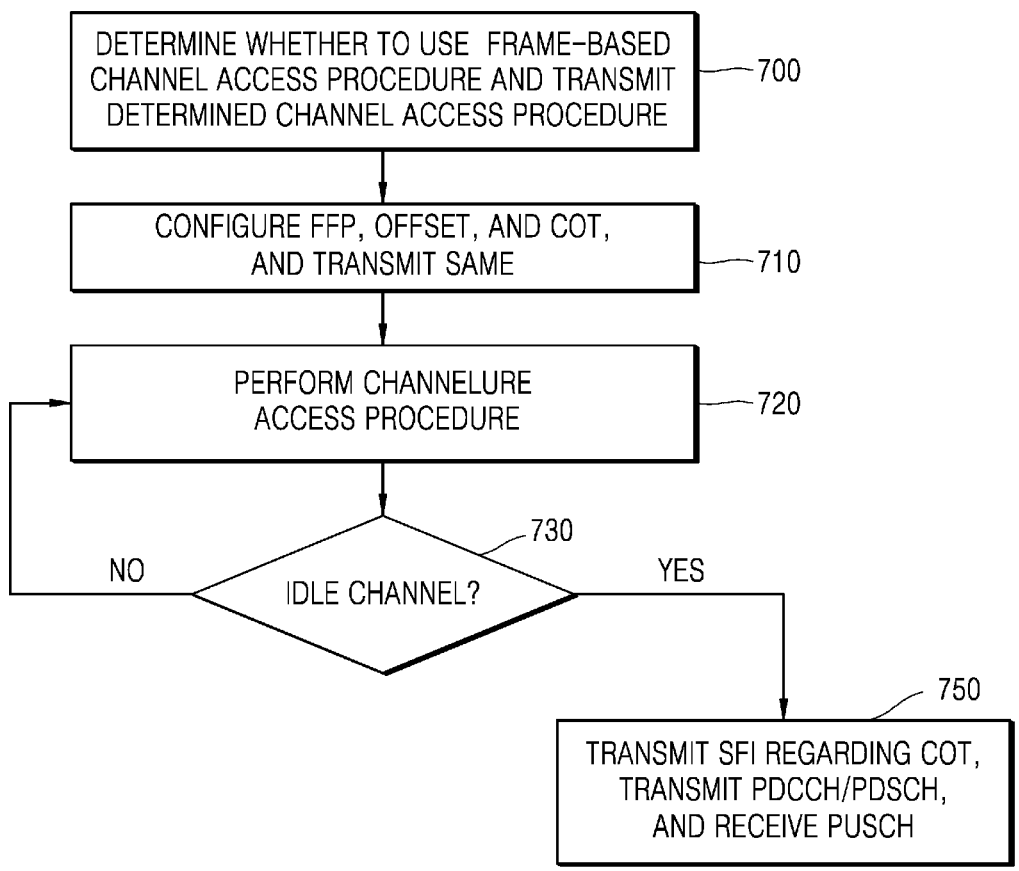
FIG. 7 is a flowchart of an operation of a base station, according to an embodiment.

FIG. 7 is a flowchart of an operation of a base station, according to an embodiment.

Referring to FIG. 7, the base station may determine whether to use a frame-based channel access procedure or a traffic-based channel access procedure, and transmit a determined channel access procedure to a terminal via at least one signaling among PBCH, SIB, and RRC signaling, in operation 700. When the frame-based channel access procedure is used, the base station may configure at least one piece of information from among FFP, an offset, and COT in the FFP, and transmit the configured information to the terminal via at least one signaling among SIB and RRC signaling, in operation 710.

In operation 720, the base station performs a channel access procedure immediately before the configured FFP.

When it is determined that an unlicensed band is in an idle state in operation 730 as a result of the channel access procedure, the base station may perform DL signal transmission and DL signal reception during the COT of the FFP in operation 750. Here, the base station may transmit, to the terminal, slot format information about a slot configuring the COT. Also, the base station may transmit slot format information about a time (symbol or slot) not used for the DL signal transmission among the COT.

When it is determined that the unlicensed band is not in the idle state in operation 730 as the result of the channel access procedure, the base station may return to operation 720 and perform the channel access procedure immediately before the configured FFP.

Figure 8:
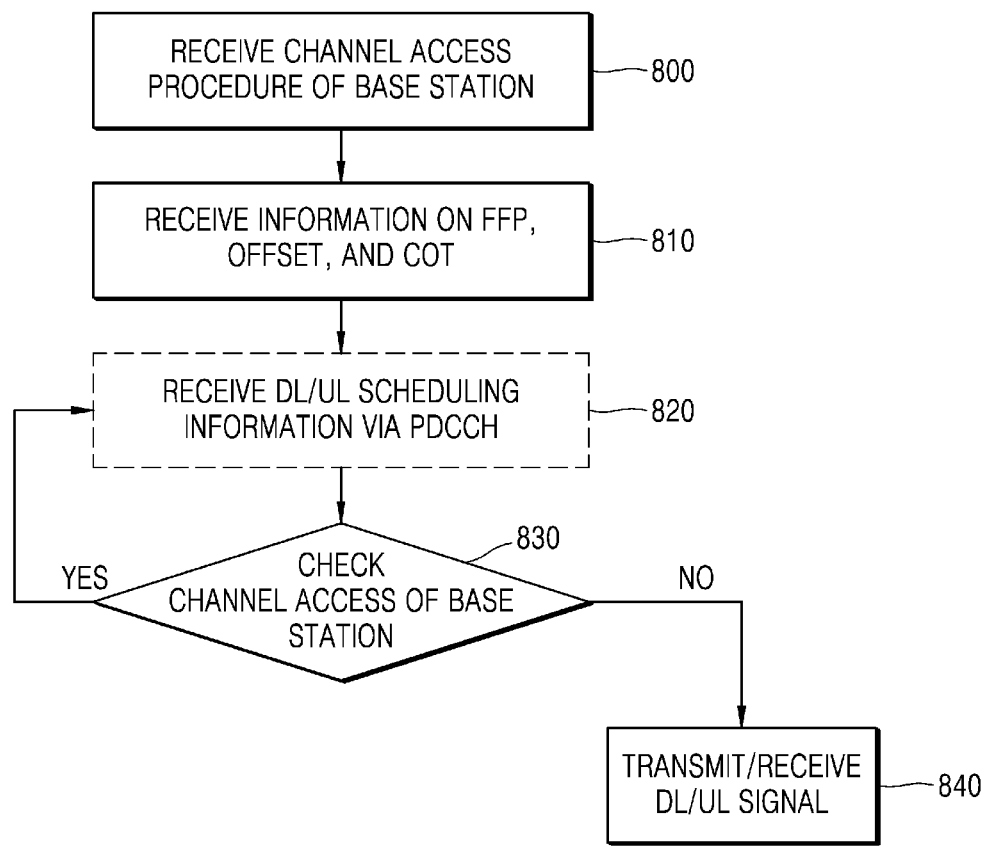
FIG. 8 is a flowchart of an operation of a terminal, according to an embodiment.

FIG. 8 is a flowchart of an operation of a terminal, according to an embodiment.

Referring to FIG. 8, the terminal may receive, via at least one signaling among PBCH, SIB, and RRC signaling, whether a frame-based channel access procedure or a traffic-based channel access procedure is used as a channel access procedure of a base station in operation 800. When the base station uses the frame-based channel access procedure, the terminal may receive at least one piece of information from among FFP, an offset, and COT in the FFP via at least one signaling among SIB and RRC signaling, in operation 810.

The terminal may search PDCCH according to a PDCCH search period and resource configured in the FFP in operation 820, and check a channel access of the base station according to the embodiment described above, in operation 830.

When it is determined that the base station did not access an unlicensed band in operation 830, the terminal does not perform UL transmission configured via a scheduled UL signal and/or a higher layer signal regardless of scheduling in operation 820. In this case, the terminal returns to operation 820 and search the PDCCH according to the PDCCH search period and resource configured in the FFP.

When it is determined that the base station accessed the unlicensed band in operation 830, the terminal may perform UL signal transmission or DL signal reception configured via the scheduled UL signal and/or higher layer signal, in operation 840.

Figure 9:
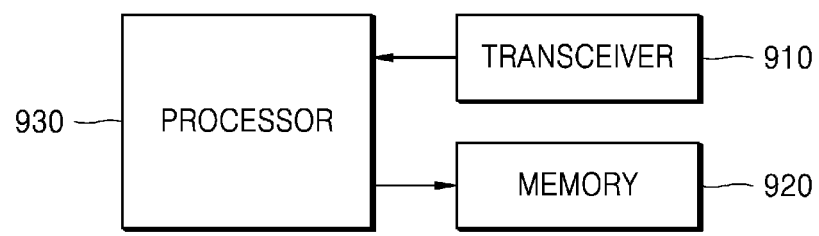
FIG. 9 is a block diagram of an internal configuration of a base station, according to an embodiment.

FIG. 9 is a block diagram of an internal configuration of a base station, according to an embodiment.

As shown in FIG. 9, the base station according to an embodiment may include a transceiver 910, a memory 920, and a processor 930. The transceiver 910, the memory 920, and the processor 930 of the base station may operate according to a communication method of the base station described above. However, the components of the base station are not limited thereto. For example, the base station may include more or fewer components than those described above. In addition, the processor 930, the transceiver 910, and the memory 920 may be implemented as a single chip. Also, the processor 930 may include at least one processor.

The transceiver 910 collectively refers to a base station receiver and a base station transmitter, and may transmit/receive a signal to/from a terminal. The signal transmitted or received to or from the terminal may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the base station. Also, the memory 920 may store control information or data included in a signal obtained by the base station. The memory 920 may be a storage medium, such as read-only memory (ROM), random access memory (RAM), a hard disk, a CD-ROM, and a DVD, or a combination of storage media.

The processor 930 may control a series of processes such that the base station operates as described above. For example, the transceiver 910 may receive a data signal including a control signal transmitted by the terminal, and the processor 930 may determine a result of receiving the control signal and the data signal transmitted by the terminal.

Figure 10:
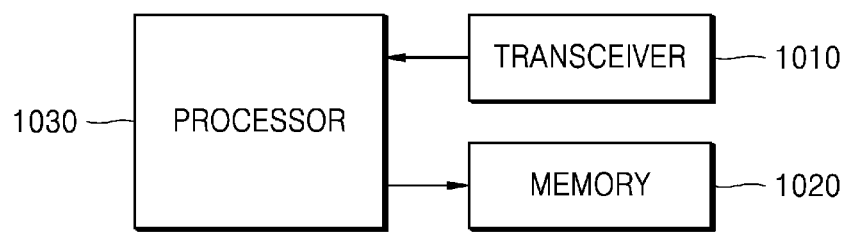
FIG. 10 is a block diagram showing an internal configuration of a terminal, according to an embodiment.

FIG. 10 is a block diagram showing an internal structure of a terminal, according to an embodiment of the present disclosure. As shown in FIG. 10, the terminal of the present disclosure may include a transceiver 1010, a memory 1020, and a processor 1030. The transceiver 1010, the memory 1020, and the processor 1030 of the terminal may operate according to a communication method of the terminal described above. However, the components of the terminal are not limited thereto. For example, the terminal may include more or fewer components than those described above. In addition, the processor 1030, the transceiver 1010, and the memory 1020 may be implemented as a single chip. Also, the processor 1030 may include at least one processor.

The transceiver 1010 collectively refers to a terminal receiver and a terminal transmitter, and may transmit/receive a signal to/from a base station. The signal transmitted or received to or from the base station may include control information and data. In this regard, the transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the terminal. Also, the memory 1020 may store control information or data included in a signal obtained by the terminal. The memory 1020 may be a storage medium, such as ROM, RAM, a hard disk, a CD-ROM, and a DVD, or a combination of storage media.

The processor 1030 may control a series of processes such that the terminal operates as described above. For example, the transceiver 1010 may receive a data signal including a control signal, and the processor 1030 may determine a result of receiving the data signal.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a base station and a terminal may operate with some of the methods proposed in the present disclosure combined together. Also, the embodiments are proposed based on a 5G or NR system, but other modifications based on technical ideas of the embodiments may be implemented on other systems, such as an LTE, LTE-A, LTE-A-Pro systems.

The invention claimed is:

1. A method of performing a channel access procedure of a terminal in an unlicensed band, the method comprising:
   receiving, via a system information block (SIB), from a base station, information indicating a type of the channel access procedure in the unlicensed band;
   receiving, from the base station, a frame-based channel access procedure configuration including a fixed frame period (FFP);
   in case that the type of the channel access procedure is a frame based channel access procedure, determining, based on the FFP, a channel occupancy time (COT) and a start time of a channel occupancy, wherein the start time of the channel occupancy is determined based on a time duration and the FFP; and
   transmitting, to the base station, an uplink signal based on a downlink signal from the base station within the COT.

2. The method of claim 1, wherein the downlink signal includes at least one of a demodulation reference signal (DMRS), a physical downlink control channel (PDCCH) and a pre-set signal.

3. The method of claim 1, wherein a maximum COT is determined by equation 2:

$$COT=FFP*Z/100, \text{ wherein } Z=95. \quad \text{[equation 2]}$$

4. The method of claim 1, further comprising receiving, from the base station, remaining channel occupancy time (RCOT) information for the base station not to transmit the downlink signal during the COT,
   wherein the transmitting of the uplink signal to the base station comprises: transmitting the uplink signal without scheduling on an uplink from the base station, based on the RCOT information.

5. The method of claim 1, wherein, in case that the base station is not occupying the channel within the COT, the transmitting of the uplink signal is not performed.

6. A method of performing a channel access procedure of a base station in an unlicensed band, the method comprising:
   determining a type of the channel access procedure in the unlicensed band;
   transmitting, via a system information block (SIB), to a terminal, information about indicating the type of the channel access procedure;
   transmitting, to the terminal, a frame-based channel access procedure configuration including a frame period (FFP);
   in case that the type of the channel access procedure is a frame based channel access procedure, determining a channel occupancy time (COT) in the FFP; and
   receiving, from the terminal, an uplink signal based on a downlink signal to the terminal within the COT,
   wherein a start time of the channel occupancy is determined based on a time duration and the FFP.

7. A terminal for performing a channel access procedure in an unlicensed band, the terminal comprising:
   a transceiver;
   at least one memory storing a program and data for performing the channel access procedure in the unlicensed band; and
   at least one processor, by executing the program stored in the at least one memory, configured to:
     receive, via a system information block (SIB), from a base station, information indicating a type of the channel access procedure in the unlicensed band;
     receive, from the base station, a frame-based channel access procedure configuration including a fixed frame period (FFP);
     in case that the type of the channel access procedure is a frame based channel access procedure, determine, based on the FFP, a channel occupancy time (COT) and a start time of a channel occupancy time, wherein the start time of the channel occupancy is determined based on a time duration and the FFP; and
     transmit, to the base station, an uplink signal based on a downlink signal from the base station within the COT.

8. The terminal of claim 7, wherein the downlink signal includes at least one of a demodulation reference signal (DMRS), a physical downlink control channel (PDCCH) and a pre-set signal.

9. The terminal of claim 8, wherein the at least one processor is further configured to:
   receive, from the base station, remaining channel occupancy time (RCOT) information for the base station not to transmit the downlink signal during the COT; and
   transmit the uplink signal without scheduling on an uplink from the base station, based on the RCOT information.

10. The terminal of claim 8, wherein the at least one processor is further configured to, in case that the base station is not occupying the channel within the COT, not perform the transmitting of the uplink signal.

11. The terminal of claim 7, wherein a maximum COT is determined by equation 2:

$$COT=FFP*Z/100, \text{ wherein } Z=95. \quad \text{[equation 2]}$$

12. A base station for performing a channel access procedure in an unlicensed band, the base station comprising:
   a transceiver;
   at least one memory storing a program and data for performing the channel access procedure in the unlicensed band; and
   at least one processor configured to execute the program stored in the at least one memory to:
     determine a type of the channel access procedure in the unlicensed band,
     transmit, via a system information block (SIB), to a terminal, information indicating the type of the channel access procedure,
     transmit, to the terminal, a frame-based channel access procedure configuration including a fixed frame period (FFP),
     in case that the type of the channel access procedure is a frame based channel access procedure, determine a channel occupancy time (COT) in the FFP, and
     receive, from the terminal, an uplink signal based on a downlink signal to the terminal within the COT,
     wherein a start time of the channel occupancy is determined based on a time duration and the FFP.

* * * * *